(12) United States Patent
Ieizumi

(10) Patent No.: US 8,192,265 B2
(45) Date of Patent: Jun. 5, 2012

(54) GAME SYSTEM

(75) Inventor: Kyoshi Ieizumi, Tokyo (JP)

(73) Assignee: Sega Corporation, Tokyo (JP)

( * ) Notice: Subject to any disclaimer, the term of this patent is extended or adjusted under 35 U.S.C. 154(b) by 1204 days.

(21) Appl. No.: 11/705,145

(22) Filed: Feb. 12, 2007

(65) Prior Publication Data

US 2007/0207853 A1 Sep. 6, 2007

(30) Foreign Application Priority Data

Feb. 14, 2006 (JP) ................................. 2006-036980
Dec. 7, 2006 (JP) ................................. 2006-330356

(51) Int. Cl.
*A63F 9/24* (2006.01)
(52) U.S. Cl. ........................................................ 463/11
(58) Field of Classification Search .................. 463/1, 9, 463/11, 42, 43
See application file for complete search history.

(56) References Cited

U.S. PATENT DOCUMENTS

| | | | | |
|---|---|---|---|---|
| 6,398,651 B1 * | 6/2002 | Yamada | ........................... | 463/43 |
| 6,468,162 B1 * | 10/2002 | Nakamura | ....................... | 463/43 |
| 2002/0193157 A1 * | 12/2002 | Yamada et al. | .................... | 463/9 |
| 2006/0063576 A1 * | 3/2006 | Schwartz | ......................... | 463/11 |
| 2006/0068918 A1 * | 3/2006 | Nagano | ........................... | 463/42 |

* cited by examiner

*Primary Examiner* — David L Lewis
*Assistant Examiner* — Eric M Thomas
(74) *Attorney, Agent, or Firm* — Dickstein Shapiro LLP

(57) ABSTRACT

The game system comprises a code reading means for reading a code recorded in a card, a computer program executing means for executing a game in which characters compute, and a display screen for displaying an image generated by the computer program. The game system further comprises a character generating means which, corresponding to a first code read by the reading means, generates a character indicated on the first card with the first code recorded in, a move generating means which, corresponding to a second code, sets a move indicated on the second card with the second cord recorded in, and a display means for displays on the display screen an image in which the character generated by the character generating means executes the move set by the move setting means to fight. When a first special code recorded in a first special card without a character indicated on is read by the code reading means, the character generating means generates a preset character, and the move setting means sets a move which is different from a move indicated on the second cord with the second code recorded in. The game system can amusingly make full use of the characteristics of the game cards.

11 Claims, 18 Drawing Sheets

FIG. 9A

[Dinosaur Card Table] /~200

| Card No. | Dinosaur Name | Attribute | Winning Move | Strength | Technique | Design Data |
|---|---|---|---|---|---|---|
| Dragon-01 | Tyrannosaurus | Fire | Paper | 2000 | 300 | Tyrannosaurus |
| Dragon-02 | Saichania | Earth | Paper | 2000 | 300 | Saichania |
|  |  |  |  |  |  |  |
| Secret-01 | Therizinosaurus | ?(None) | Rock | 1500 | ∞(infinite) | Therizinosaurus |
| Secret-03 | Deinonychus | ?(None) | Paper | ?(Random) | ∞(infinite) | Deinonychus |
|  |  |  |  |  |  |  |
| Dragon-38A | Irritator | Water | Rock | 1000 | 1000 | Irritator A |
| Dragon-40A | Wuerhosaurus | Earth | Paper | 1000 | 1000 | Wuerhosaurus A |
|  |  |  |  |  |  |  |

FIG. 9B

[Move Card Table] /~210

| Card No. | Move Name | Attribute | Janken Kind | Move Strength | Compatibility | Technique | Design Data |
|---|---|---|---|---|---|---|---|
| Move-01 | Tail Smash | None | Rock | No indication | ◎◎◎◯◯◯ | 200 | Tail Smash |
| Move-02 | Death Grind | None | Scissors | No indication | △△◎◎◯◯ | 500 | Death Grind |
|  |  |  |  |  |  |  |  |
| Fire-02 | Big Fire Bomb | Fire |  | No indication | Type Checker Red | None | Big Fire Bomb |
| Earth-02 | Big Mole Attack | Earth |  | No indication | Type Checker Purple | None | Big Mole Attack |
|  |  |  |  |  |  |  |  |
|  |  |  |  |  |  |  |  |
|  |  |  |  |  |  |  |  |
|  |  |  |  |  |  |  |  |

FIG. 9C

[Character Card Table] /~220

| Card No. | Character Name | Attribute |
|---|---|---|
| D-01 | Ryuta | Fire |
| D-02 | Ryuta | Thunder |
|  |  |  |
|  |  |  |
|  |  |  |
|  |  |  |
|  |  |  |

FIG. 10

[Secret Dinosaur Specialized Move Data Table]   230

| Secret Dinosaur Name | Janken Kind | Move name | Attribute | Move strength | Compati-bility | Technique | Design Data |
|---|---|---|---|---|---|---|---|
| Secret-01 (Therizinosaurus) | Rock | Nail Blade | ? | No indication | None | None | Nail Blade |
| | Scissors | Gyroslasher | ? | No indication | None | None | Gyroslasher |
| | Paper | Dangerous Claw | ? | No indication | None | None | Dangerous Claw |
| Secret-03 (Deinonychus) | Rock | Dina Galaxy | ? | No indication | None | None | Dina Galaxy |
| | Scissors | Cross Cutter | ? | No indication | None | None | Cross Cutter |
| | Paper | Rolling Attack | ? | No indication | None | None | Rolling Attack |
| | | | | | | | |
| | | | | | | | |
| | | | | | | | |
| | | | | | | | |
| | | | | | | | |

FIG. 11A1

[1P-Side Dinosaur Table]

301

| 1P-side Dinosaur | |
|---|---|
| Dinosaur Name | Tyrannosaurus |
| Attribute | Fire |
| Winning Move | Paper |
| Strength | 2000 |
| Technique | 300 |
| Design Data | Tyrannosaurus |

FIG. 11A2

[2P-Side Dinosaur Table]

302

| 2P-side Dinosaur | |
|---|---|
| Dinosaur Name | Triceratops |
| Attribute | Thunder |
| Winning Move | Scissors |
| Strength | 1400 |
| Technique | 700 |
| Design Data | Triceratops |

FIG. 11B1

[1P-Side Move Data Table]

311

| 1P-Side Move | |
|---|---|
| Move Name | Tail Smash |
| Attribute | None |
| Move Strength | No indication |
| Compatibility | ◎◎◎◯◯◯ |
| Technique | 200 |
| Design Data | Tail Smash |

FIG. 11B2

[2P-Side Move Data Table]

312

| 2P-Side Move | |
|---|---|
| Move Name | Death Grind |
| Attribute | None |
| Move Strength | No indication |
| Compatibility | △△◎◯◯◯ |
| Technique | 500 |
| Design Data | Death Grind |

FIG. 11C1

[1P-Side Character Data Table]

321

| Character | |
|---|---|
| Name | Ryuta |
| Attribute | Fire |

FIG. 11C2

[1P-Side Character Data Table]

322

| Character | |
|---|---|
| Name | Ryuta |
| Attribute | Thunder |

FIG. 11D

[Janken Data Table]

330

| Janken | |
|---|---|
| 1P | Rock |
| 2P | Scissors |

GAME SYSTEM

BACKGROUND OF THE INVENTION

The present invention relates to a game system using game cards.

Conventionally, the game cards are generally trump cards, but games using game cards of various kinds, such as trading cards, etc., are also popular.

The card game in which game players repeatedly compete for win or loss by comparing the competition cards bearing characters' pictures, attack forces and physical forces to those of the other to defeat in advance the other competition cards is known (refer to, e.g., Patent Reference 1).

Recently the game system which executes card games by reading game cards bearing identification codes, such as bar codes, etc., by a game machine including a card reader (refer to, e.g., Patent Reference 2).

Patent Reference 1 is Specification of Japanese Patent Application Unexamined Publication No. 2001-204874.

Patent Reference 2 is Pamphlet of International Publication No. WO2005/105238A1

SUMMARY OF THE INVENTION

An object of the present invention is to provide a game system which can amusingly make full use of the characteristics of the game cards.

The game system according to one aspect of the present invention is characterized in that the game system including a code reading means for reading a code recorded in a card, a computer program executing means for executing a game in which at least two characters compete, and a display screen for displaying an image generated by the computer program executing means, comprises: a character generating means which, corresponding to a first code read by the reading means, generates a character indicated on the first card with the first code recorded in; a move setting means which, corresponding to a second code read by the reading means, sets a move indicated on the second card with the second code recorded in; and a display means for displaying on the display screen an image in which the character generated by the character generating means execute the move set by the move setting means to fight, when a first special code recorded in a first special card without a character indicated on is read by the code reading means, the character generating means generating a preset character, and the move setting means setting a move which is different from the move indicated on the second card with the second code recorded in.

In the above-described game system it is possible that the move which is set by the move setting means and is different from the move indicated on the second card with the second code recorded in is stronger than the move indicated on the second card.

In the above-described game system, it is possible that the move which is set by the move setting means and is different from the move indicated on the second card with the second code recorded in is a move which is not prepared as the second cards.

The game system according to one aspect of the present invention is characterized in that the game system including a code reading means for reading a cord recorded in a card, a computer program executing means for executing a game in which at least two character fight, and a display screen for displaying an image generated by the computer program executing means, comprises: a first character generating means which, corresponding to a first code read by the reading means, generates a first character indicated on the first card with the first code recorded in; a move setting means which, corresponding to the second code read by the reading means, set a move indicated on the second card with the second code recorded in; a second character generating means which, corresponding to a third code read by the reading means, sets a second character indicated on the third card with the third code recorded in; and a display means for displaying on the display screen an image in which the first character generated by the first character generating means executes the move set by the move setting means to fight, and the display means displaying on the display screen an image containing the first character executing the move to fight and the second character.

The game system according to one aspect of the present invention is characterized in that the game system including a code reading means for reading a code recorded in a card, a computer program executing means for executing a game in which at least two characters compete, and a display screen for displaying an image generated by the computer program executing means, comprises: a first character generating means which, corresponding to a first code read by the reading means, generates a character indicated on the first card with the first code recorded in; a move setting means which, corresponding to a second code read by the reading means, sets a move indicated on the second card with the second code recorded in; and a second character generating means which, corresponding to a third code read by the reading means, sets a second character indicated on the third card with the third code recorded in, when an attribute of the second character and an attribute of the first character agree with each other, the first character generating means sets a parameter of the first character at a value different form a standard value.

In the above-described game system, it is possible that the second character is a character which does not fight with a character the first character fights with.

The game system according to the present invention comprises a character generating means which, corresponding to a first code read by a reading means, generates a character indicated on a first card with the first code recorded in, a move setting means which, corresponding to a second code read by the reading means, sets a move indicated in a second card with the second code recording means, and a display means which displays a on a display screen an image in which the character generated by the character generating means executes the move set by the move setting means to fight. When a first special cord recorded in a first special card without a character indicated on is read, the character generating means generates a preset character, and the move setting means sets a move which is different from a move indicated on a second card with the second code recorded in. Consequently, the game system can amusingly make full use of the characteristics of the game cards.

BRIEF DESCRIPTION OF THE DRAWINGS

FIG. 9 is views of the tables provided in the game device used in the game system according to the embodiment of the present invention (Part 1).

FIG. 10 is a view of the table provided in the game device used in the game system according to the embodiment of the present invention (Part 2).

FIG. 11 is views of the tables provided in the game device used in the game system according to the embodiment of the present invention (Part 3).

DETAILED DESCRIPTION OF THE INVENTION

An Embodiment

The game system according to an embodiment of the present invention will be explained with reference to the drawings. In the game system according to the present embodiment, a game is made by reading the game cards illustrated in FIGS. 3 to 8 into the game system illustrated in FIGS. 1 and 2.

The applicant of the present invention has developed as a game system using game cards a game system ("The King of Beetles MUSHIKING" (registered trademark), which is themed to fights between beetles. The game is played by the game cards being read by the game device to input data. In this game machine, by computer graphics, the beetles are displayed on the display monitor and displayed in motion pictures at all angles.

The game contents of this game system are a card fight game in which beetles are fought with each other. The game cards are mushi (insect) cards bearing kinds of the beetles, and move (waza) cards bearing moves or skills for the fights. Combinations of the mushi (insect) cards and the move (waza) cards are inputted through the card reader of the game machine to fight the beetles by a janken (rock-paper-scissors). The worldwide beetles reproduced very real, and the winning moves made by them are points of the game.

The game system according to the present embodiment is different from The King of Beetles MUSHIKING in that the former is a game system ("DINOSAURKING" (registered trademark) themed to fights between dinosaurs in place of beetles but, the other points, is basically the same as the latter.

(Game Machine)

Figure 1:
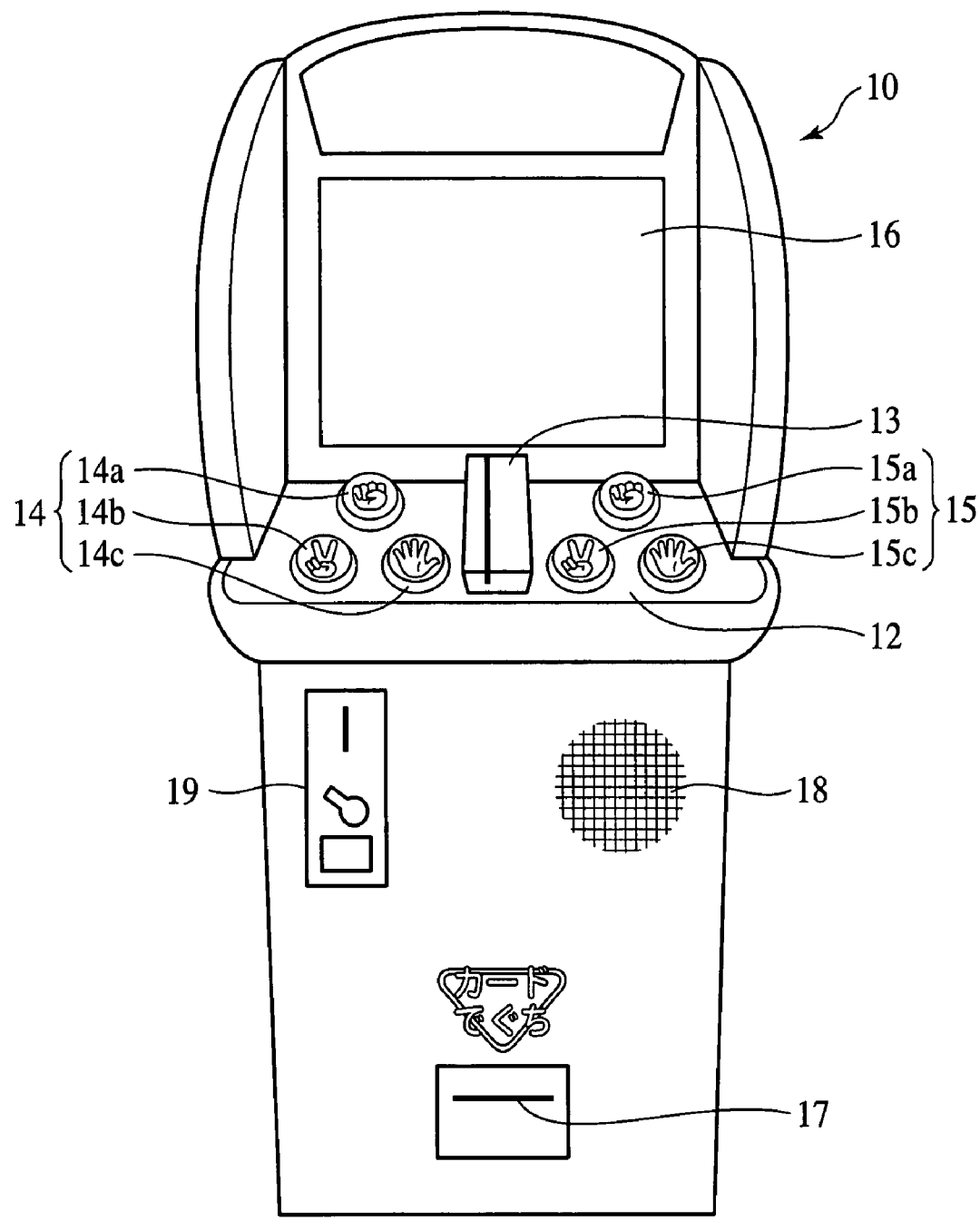
FIG. 1 is a view of the game device used in the game system according to one embodiment of the present invention.

FIG. 1 illustrates the game machine used in the game system according to the present embodiment. FIG. 1 is the front view of the game machine.

The game machine 10 comprises a 130 cm height vertical casing. An operation board 12 is projected forward from the middle of the game machine 10. At the center of the operation board 12, a card reader 13 is provided capable of scanning the cards length-wise. On the operation board 12 on both sides of the card reader 13, three input buttons 14 and three input buttons 15 to be operated by push are respectively provided. The three input buttons 14a, 14b, 14c are mainly for the janken (rock-paper-scissors) input by a game player on the 1P side, and the three input buttons 15, 15b, 15c are mainly for the janken (rock-paper-scissors) input by a game player on the 2P side. On the surface of the input buttons 14a, 15a, the hand pattern of "Rock" is provided, the hand pattern of "Scissors" is provided, and the hand pattern of "Paper" is provided on the surfaces of the input buttons 14c, 15c.

Above the operation panel 12 of the game machine 10, a display monitor 16 is mounted on the casing, faced forward.

Below the operation board 12 of the game machine 10, a card outlet 17 is provided. The game cards are discharged from a card vender (not illustrated) in the casing of the game machine 10. Below the left side of the operation board 12 of the game machine 10, a coin selector 19 is provided. Below the right side of the operation board 12 of the game machine 10, a speaker 18 is provided. From the speaker 18, various effect sounds are outputted during the game.

Game players insert coins, game money into the coin selector 19. When the inserted coins are received, one game card is discharged into the card outlet 17 from the card vendor (not illustrated). The game players cause the card reader 13 to scan the discharged game card to make various commands.

(Information Processing Device)

Figure 2:
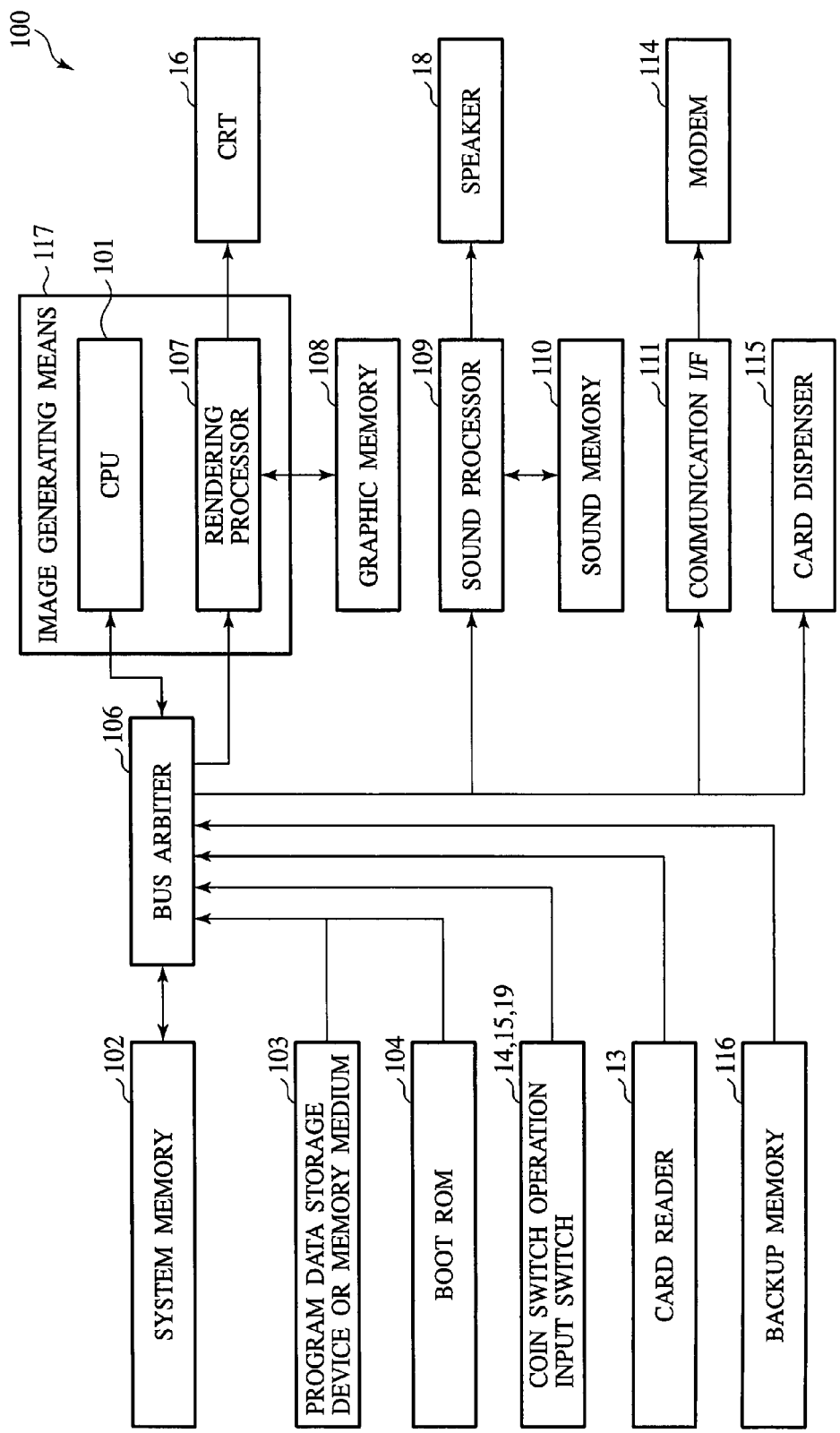
FIG. 2 is a block diagram of the game device used in the game system according to the embodiment of the present invention.

The information processing device (game board included in the game machine 10 of the present embodiment will be explained with reference to FIG. 2. FIG. 2 is the block diagram of the information processing device, which is the game board.

The information processing device 100 includes a CPU 101 which controls the whole by executing programs, a BOOT ROM 104 which stores programs for actuating the information processing device 100 and a system memory 102 which stores image producing programs and other programs to be executed by the CPU 101, and data. The information processing device 100 functions as a computer which executes the general information processing programs, and a game information processing device of a personal computer which can execute programs, the game information processing device of a game machine, etc.

The programs and data to be executed by the CPU 101 contain, in addition to the programs and data for controlling the game, programs and data for generating and controlling images to be displayed, which correspond to base character data and part data of the characters, character generating programs, etc. of the present embodiment.

To generate display images, polygon data (vertex data) including three-dimensional local coordinate data forming objects to be displayed, and NURBS (Non Uniform Rational B-Spline) data (curved surface data and control point data) are stored by the system memory 102 and are arranged in a world coordinate system of a three-dimensional virtual space by the CPU or a geometry processor (not illustrated) to be converted from the local coordinates to the world coordinate system.

Furthermore, viewpoint coordinates generated by operations of the game players and as the game advances are set in the world coordinate system, objects which are present in the view field in a prescribed view direction and at a prescribed image angle as viewed at this viewpoint are converted to a viewpoint coordinate system having the viewpoint coordinates as the origin, and the coordinates of such converted objects are transmitted to a rendering processor 107.

The rendering processor 107 first makes interpolation processing, such as light source processing, etc. on the coordinates of the transmitted objects and pastes texture data stored in the graphic memory 108 to the objects to detail the surfaces of the objects. The rendering processor 107 further projects, based on the three-dimensional cubic objects, the objects (polygons) on a two-dimensional plane (screen) for the display on the display monitor 16 to convert the three-dimensional cubic objects to two-dimensional coordinate data (screen coordinate system), displays the polygons of smaller Z-coordinates prior to those of larger Z-coordinates to generate two-dimensional images, and outputs the two-dimensional images to the display monitor 16, such as a CRT, a liquid crystal display device or others.

As described above, the CPU 101 and the rendering processor 107 are controlled by the image generating programs to function as image generating means 117.

In the present embodiment, character evaluating means includes the CPU 101 and the system memory 102. Character generating means includes the CPU 101, the system memory 102, the rendering processor 107 and the graphic memory 108.

The information processing device 100 includes input means, such as the card reader 13 for inputting the codes recorded in the cards, the operation input switches 14a, 14b, 14c, 15a, 15b, 15c, the coin selector 19, etc.

The information processing device 100 includes backup memory 116 which stores result data at the point when the game players have paused the game and reads the result data to resume the game when the same game is resumed next time.

The information processing device 100 includes a sound processor 109 which generates sounds, and a sound memory 110 which stores data of generated sounds. The sound processor 109 generates digital signals of sounds, based on the data stored in the sound memory 110 and converts the digital signals to analog sounds by a D/A converter (not illustrated) to output the sound to the speaker 18 or a headphone (not illustrated).

The information processing device 100 includes a program data memory device or a record medium 103, and the game programs and data stored in the record medium 103 are read into the system memory 102, the graphic memory 108 and the sound memory 110.

The data stored in the record medium 102 contain, in addition to programs and data for controlling the game, programs and data for generating and controlling images to be displayed.

The record medium 103 includes mediums which can optically read, such as CD-ROM, DVD-ROM, and mediums which can optically read, such as mask ROM, and flash memory.

The information processing device 100 includes a communication interface 111 and a modem 114 and is connected to a network IN via a LAN or a modem 114.

When coins corresponding to the game money are inserted into the coin selector 19, the information processing device 100 supplies a discharge signal for discharging a game card to the card dispenser 115, and the card dispenser 115 discharges one game card.

The above-described constituent members of the information processing device 100 are interconnected by signal lines, such as buses, etc., and the output/input of the programs and data between the respective constituent members are controlled by a bus arbiter 106.

(Game Cards)

Specific examples of the game cards used in the game system according to the present embodiment will be explained with reference to FIGS. 3 to 8.

Figure 7:
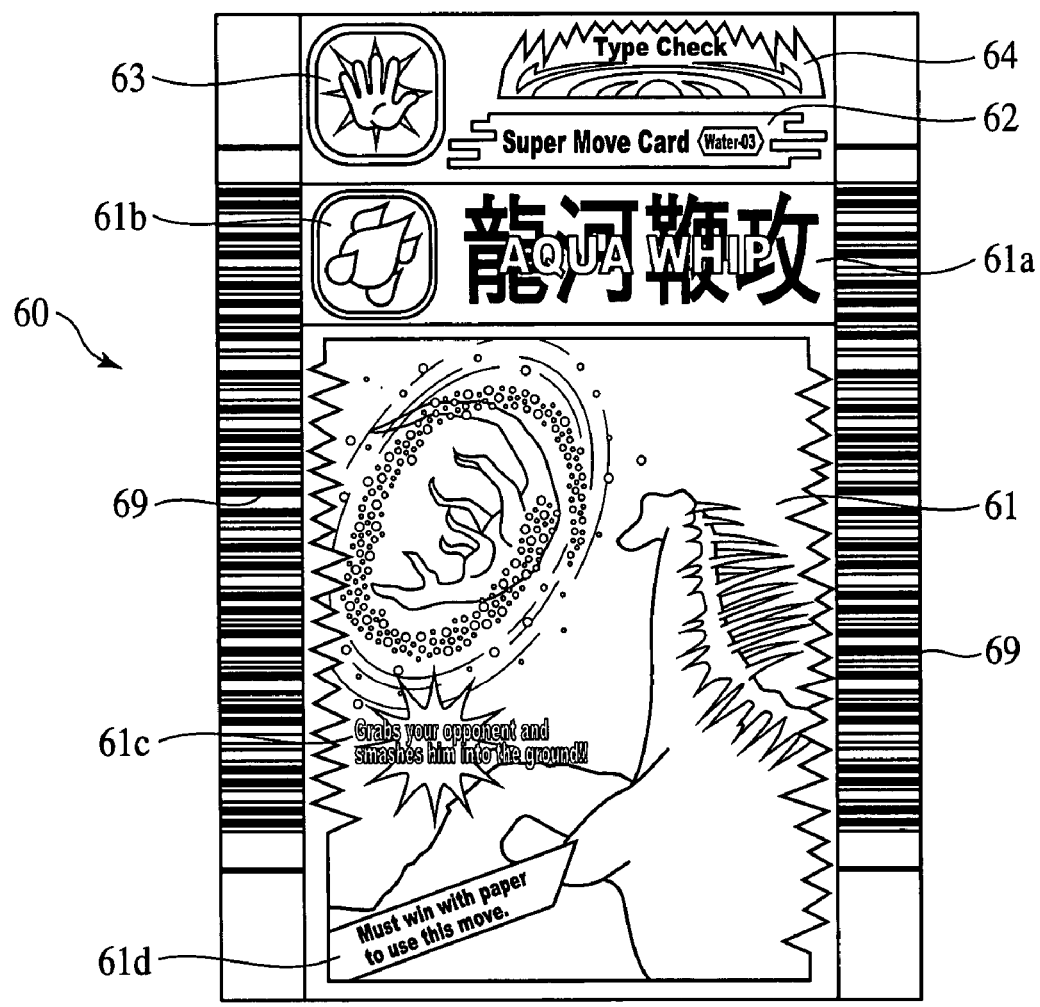
FIG. 7 is a view of the super move card which is an example of the game card used in the game system according to the present invention.
Figure 8:
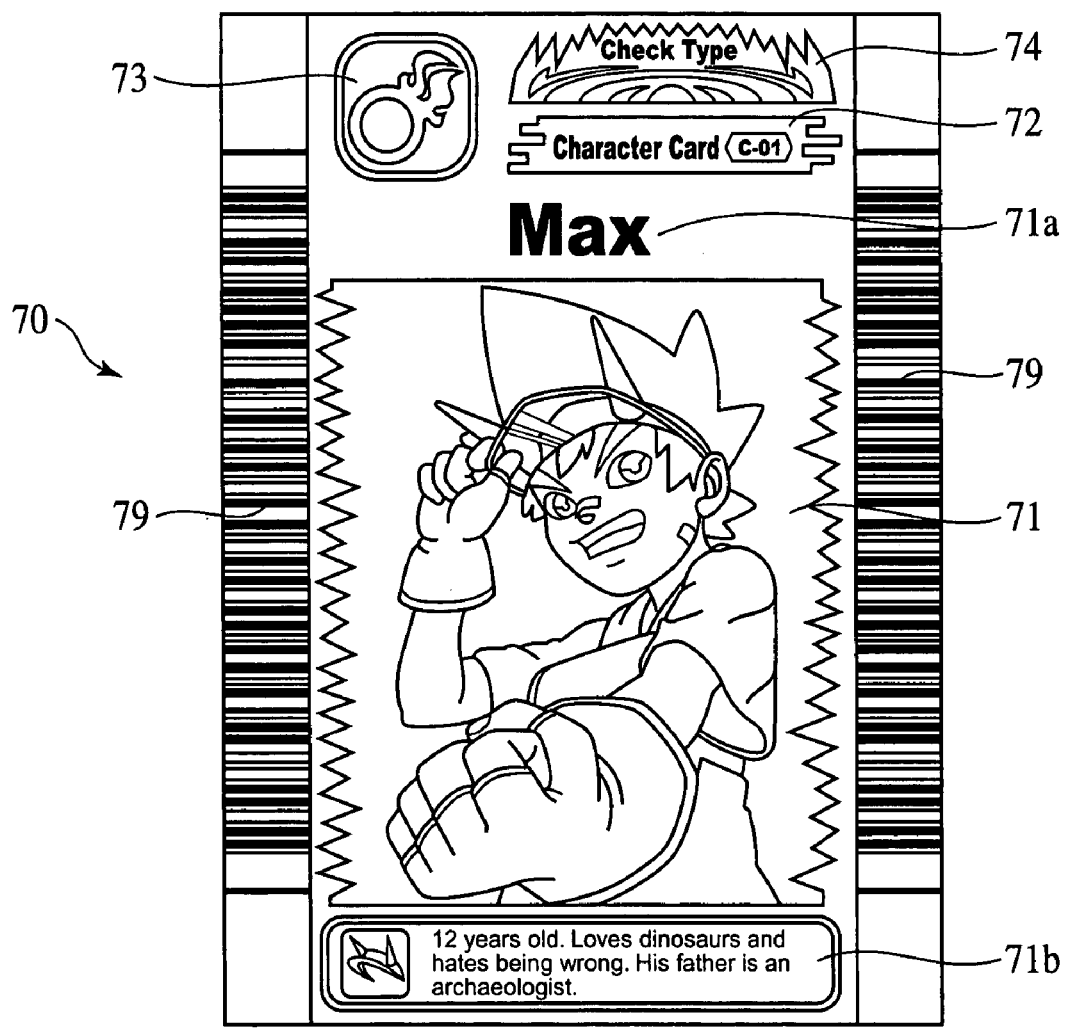
FIG. 8 is a view of the character card which is an example of the game card used in the game system according to the present invention.

The game cards of the present embodiment are 88 mm length×63 mm width thick paper cards of the so-called trump size. In the present embodiment, 6 kinds of the game cards (dinosaur king cards) are prepared. The game cards are a dinosaur card for setting dinosaurs (FIG. 3), a secret dinosaur card (FIG. 4), a different color dinosaur card (FIG. 5), a move card for setting a move (FIG. 6), a super move card (FIG. 7) and a character card for setting a character to be staged in the story (FIG. 8).

(Dinosaur Card)

Figure 3:
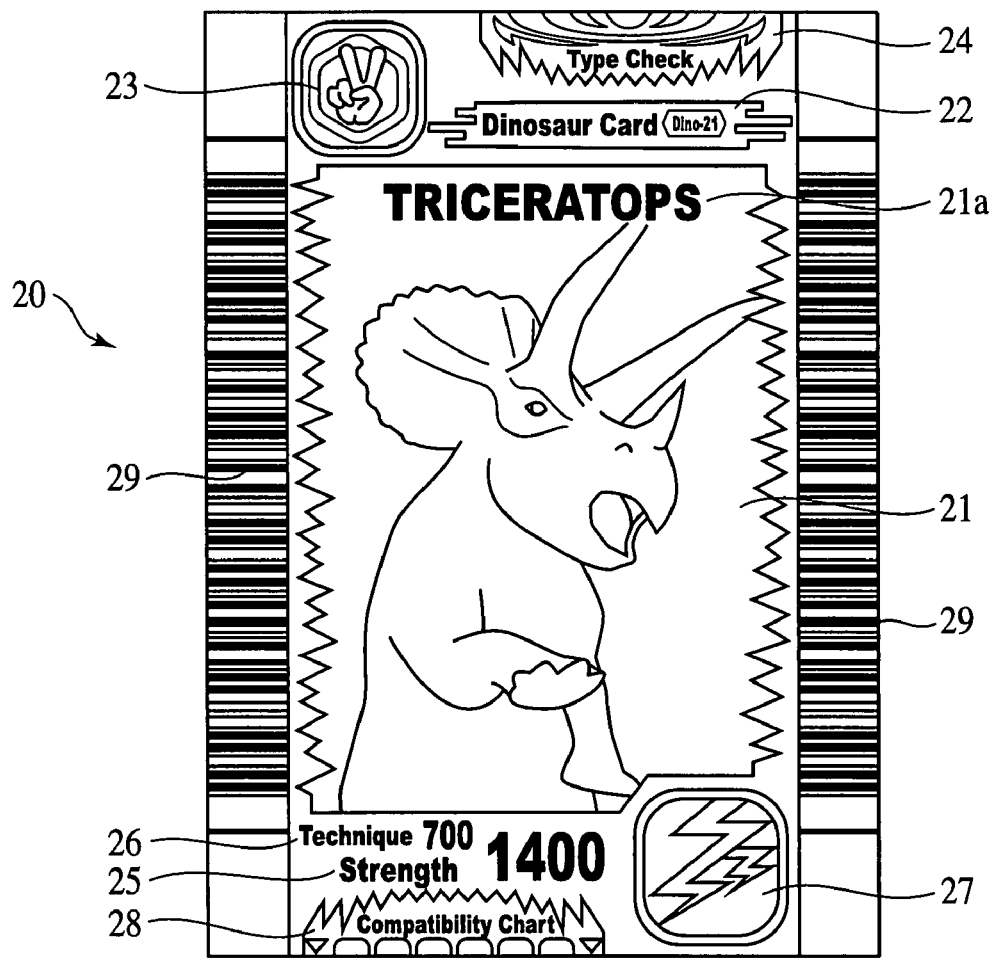
FIG. 3 is a view of the dinosaur card which is an example of the game card used in the game system according to the present invention.

The dinosaur card 20 will be explained with reference to FIG. 3. FIG. 3 illustrates the front side of the dinosaur card 20. On the back side of the dinosaur card 20, the explanation, etc. of the dinosaur are made, but they are not detailed here.

The dinosaur card 20 is read by the card reader 13 of the game machine 10 to thereby set a dinosaur to be the partner of a game player.

As illustrated in FIG. 3, a dinosaur visual column 21 where the image of a dinosaur is described is provided at the center of the front side of the dinosaur card 20, and a dinosaur name column 21a where the name of the dinosaur is described is provided at an upper part in the dinosaur visual column 21. In FIG. 3, the image of a TRICERATOPS is described in the dinosaur visual column 21, and "TRICERATOPS" is described in the dinosaur name column 21a.

In the middle of an upper part of the front side of the dinosaur card 20, a dinosaur card number indication column 22 where the card name (dinosaur card) and a card number are indicated is provided. In FIG. 3, "Dinosaur Card Dino-21" is indicated in the dinosaur card number indication column 22.

At an upper left part of the front side of the dinosaur card 20, a janken (rock-paper-scissors) mark column 23 where a hand of janken (rock-paper-scissors) which allows a dinosaur to make the winning move is indicated is provided. When a game player sets a dinosaur by using the dinosaur card 20 and wins janken (rock-paper-scissors) with the mark of janken (rock-paper-scissors) indicated in the janken (rock-paper-scissors) mark column 23, the game player can make the winning move which much damages the competitor dinosaur.

At the uppermost margin of the front side of the dinosaur card 20, a type checker column 24 where a pattern for confirming a usable super move (which will be described alter) is described is provided. When a pattern described in the type checker column 24 and a pattern described in the type checker column of the super move card which will be described later agree with each other, the super move card can be used.

In the middle of a lower part of the front side of the dinosaur card 20, a strength indication column 25 where strength is indicated in a value is provided. In FIG. 3, "Strength 1400" is indicated in the strength indication column 25.

At a lower left part of the front side of the dinosaur card 20, a technique indication column 26 where a technique is indicated in a value is provided. As the value indicated in the technique indication column 26 is larger, a power up value is larger when the move card which will be described later is used. In FIG. 3, "Technique 700" is indicated in the technique indication column 26.

At a lower right part of the front side of the dinosaur card 20, an attribute mark column 27 where the attribute of this dinosaur is indicated is provided. Each dinosaur has one of the attributes "Fire", "Water", "Lightning", "Earth", "Glass", and "Wind". In FIG. 3, the pattern of the attribute "Lightning" is indicated in the attribute mark column 27.

At the lowermost margin of the front side of the dinosaur card 20, a compatibility checker column 28 where the compatibility with the move card which will be described later is indicated is provided. When the pattern indicated in the compatibility checker column 28 and the pattern described in the compatibility checker column of the move card which will be described later agree with each other, it can be confirmed that the compatibility of the dinosaur card 20 with that of the move card are in agreement with each other.

At the left and the right margins of the front side of the dinosaur card 20, a bar code columns 29 where bar codes are indicated for the card reader 13 of the game machine 10 to read for reading the card are provided.

(Secret Dinosaur Card)

Figure 4:
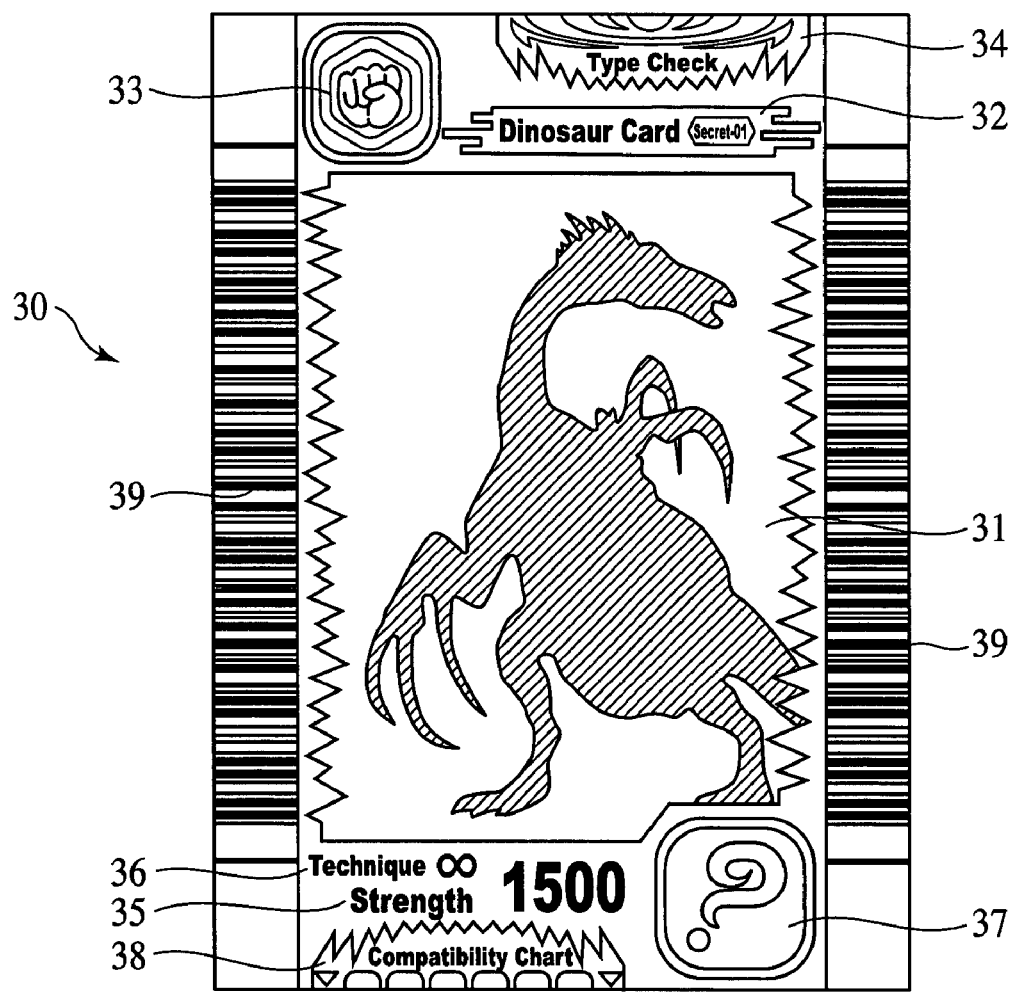
FIG. 4 is a view of the secret dinosaur card which is an example of the game card used in the game system according to the present invention.

The secret dinosaur card will be explained with reference to FIG. 4. FIG. 4 illustrates the front side of the secret dinosaur card 30. The secret dinosaur card 30 does not identify the dinosaur and has, in place of the explanation of the dinosaur, a silhouette of the dinosaur described on the back side. The back side of the secret dinosaur card 30 will not be detailed.

The secret dinosaur card 30 is one kind of the dinosaur cards but is a special card having no dinosaur described on the card surfaces. The secret dinosaur card 30 has no dinosaur name indicated on the front side but, on the back side, has a dinosaur name indicated unidentifiably in the same number of "?" as the letter number of the dinosaur name.

A game player cannot see what dinosaur will appear by watching the secret dinosaur card 30. The secret dinosaur card 30 is read by the card reader 13 of the game machine 10 to thereby generate a prescribed dinosaur, and the game player cannot see the dinosaur to be the partner until the dinosaur is displayed on the display monitor 16.

The game control which is different for the general dinosaur cards is made on the secret dinosaur card 30 and will be detailed later.

As illustrated in FIG. 4, at the center of the front side of the secret dinosaur card 30, a dinosaur visual column 31 where the image of a dinosaur is to be described is provided, but no dinosaur name column where the name of the dinosaur is provided. In FIG. 4, the image of a dinosaur whose name is unknown is described silhouette in the dinosaur visual column 31.

At the middle of an upper part of the front side of the secret dinosaur card 30, a dinosaur card number indication column 32 where the card name (dinosaur card) and a dinosaur card number are described is provided. In FIG. 4, in the dinosaur card number indication column 32, "Dinosaur Card Secret-01" is described.

At an upper right part of the front side of the secret dinosaur card 30, a janken (rock-paper-scissors) mark indication column 33 where a hand pattern of janken (rock-paper-scissors) for the dinosaur using a winning move is provided. When a game player sets a dinosaur by using the secret dinosaur card 30 and wins janken (rock-paper-scissors) with the hand pattern indicated in the janken (rock-paper-scissors) mark column 33, the game player can make the winning move. In FIG. 4, "Rock" is indicated in the janken (rock-paper-scissors) mark column 33.

At the uppermost margin of the front side of the secret dinosaur card 30, a type checker column 34 where a pattern for confirming a usable super move card (to be described later). When a pattern described in the type checker column 34 and a pattern described in the type checker column of the super move card which will be described later agree with each other, the super move can be used. In the secret dinosaur card 30, with which, as will be described later, the super move card cannot be used, a pattern which does not agree with any of the patterns described in the type checker columns of the super move cards is described.

At the middle of a low part of the front side of the secret dinosaur card 30, a strength indication column 36 where strength is indicated in a value is provided. In FIG. 4, "Strength 1500" is indicated in the strength indication column 35.

At a lower left part of the front side of the secret dinosaur card 30, a technique indication column 36 where a technique is indicated in a value is provided. As the value indicated in the technique indication column 36 is larger, the power up value used in the move card which will be described later is larger. In the secret dinosaur card 30, in which the technique is infinite, "Technique ∞" is indicated in the technique indication column 36 as illustrated in FIG. 4.

At a lower right part of the secret dinosaur card 30, an attribute mark column 36 where a technique is indicated in a value is provided. Each dinosaur has one of the attributes "Fire", "Water", "Lightning", "Earth", "Glass", and "Wind". The dinosaur generated by the secret dinosaur card 30 has no attribute and, as illustrated in FIG. 4, the pattern "?" which indicates that the attribute is unknown is indicated.

At the lowermost margin of the secret dinosaur card 30, a compatibility checker column 38 which confirms the compatibility with the move card which will be described later is provided. When a pattern indicated in the compatibility checker column 38 and a pattern indicated in the compatibility checker column of the move card which will be described later agree with each other, it can be confirmed that the secret dinosaur card 30 is compatible with the move card. The secret dinosaur card 30 is compatible with any move card, and as illustrated in FIG. 4, a pattern which makes the secret dinosaur card 30 compatible with any move card is indicated.

At the left and the right margins of the secret dinosaur card 30, bar code columns 39 where bar codes are indicated for the card reader 13 of the game device 10 to read for reading the card are provided.

(Color Different Dinosaur Card)

Figure 5:
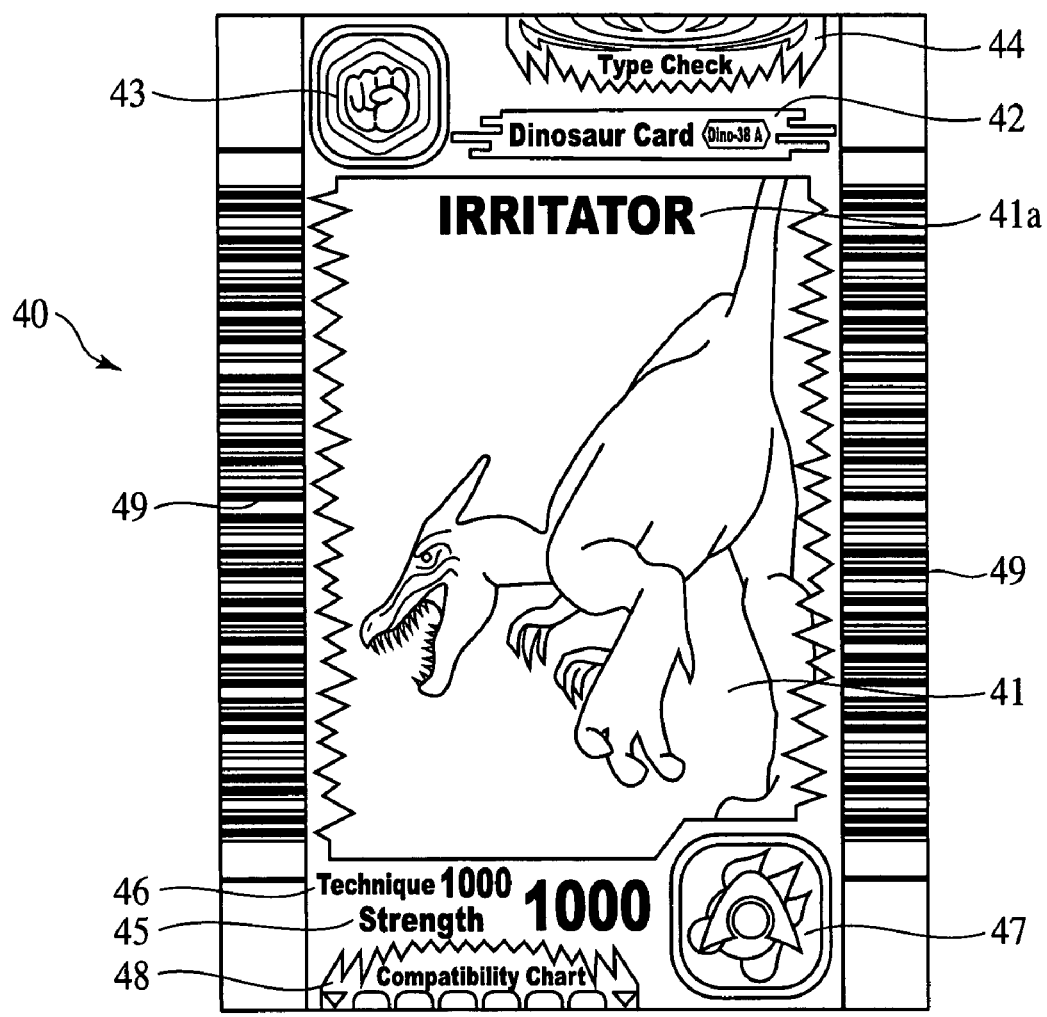
FIG. 5 is a view of the color different dinosaur card which is an example of the game card used in the game system according to the present invention.

The color different dinosaur card 40 will be explained with reference to FIG. 5. FIG. 5 illustrates the front side of the color different dinosaur card 40. On the back side of the color different dinosaur card 40, the explanation, etc. of a dinosaur are presented, but they are not detailed here.

The color different dinosaur card 40 is one kind of the dinosaur card but is a special dinosaur card having a dinosaur described in a body color different from the body color. The color different dinosaur card 40 is subjected to game control different from the game control made on the general dinosaur cards, and the game control to be made on the color different dinosaur card 40 will be detailed later.

As illustrated in FIG. 5, at the center of the font side of the color different dinosaur card 40, a dinosaur visual column 42 where the image of a dinosaur is indicated is provided, and at an upper part in the dinosaur visual column 42, a dinosaur name column 41a where the name of a dinosaur is indicated is provided. In FIG. 5, in the dinosaur visual column 41, the image of IRRITATOR is indicated in a color different from the color of the usual IRRITATOR, e.g., pink color, and "IRRITATOR" is indicated in the dinosaur name column 41a.

At the middle of an upper part of the font side of the color different dinosaur card 40, a dinosaur card number indication column 42 where the card name (dinosaur card) and a card number are indicated is provided. In FIG. 5, "Dinosaur Card Dino-38A" is indicated in the dinosaur card number indication column 42.

At an upper left part of the front side of the color different dinosaur card 40, a janken (rock-paper-scissors) mark column 43 where a hand pattern for using a winning move is indicated is provided. When, by using the color different dinosaur card 40, a game player sets a dinosaur and wins the janken (rock-paper-scissors) with a hand pattern indicated in the janken (rock-paper-scissors) mark column 43, a winning move which much damages the competitor can be used. In FIG. 5, "Rock" is indicated in the janken (rock-paper-scissors) mark column 43.

At the upper most margin of the front side of the color different dinosaur card 40, a type checker column 44 where a pattern for confirming a usable super move (which will be described later) is provided. When a pattern described in the checker column 44 and a pattern indicated in the super move card which will be described alter agree with each other, the super move card can be used.

At the middle of a lower part of the front side of the color different dinosaur card 40, a strength indication column 45 where the strength is indicated in a value is provided. In FIG. 5, "Strength 1000" is indicated in the strength indication column 45.

At a lower left part of the front side of the color different dinosaur card 40, a technique indication column 46 where the technique is indicated in a value is provided. As the value indicated in the technique indication column 46 is larger, the power up value is increased when the move card which will be described later. In FIG. 5, "Technique 1000" is indicated in the technique indication column 46.

At a lower right part of the front side of the color different dinosaur card 40, an attribute mark column 74 where the attribute of the dinosaur is indicated is provided. Each dinosaur has one of six attributes "Fire", "Water", "Lightning", "Earth", "Glass", and "Wind". The attribute of the color different dinosaur card 40 is an Act Team (Alpha Gang), and as illustrated in FIG. 5, the pattern "A" indicating the attribute "Act Band" is added to the one of the attributes "Fire", "Water", "Lightning", "Earth", "Glass", and "Wind".

At the lowermost margin of the front side of the color different dinosaur card 40, a compatibility checker column 48 for the confirmation of the compatibility with the move card which will be described later is provided. When a pattern indicated in the compatibility checker column 48 and a pattern indicated in the compatibility checker column which will be described alter agree with each other, it can be confirmed that the color different dinosaur card 40 is compatible with the move card.

At the left and right margins of the front side of the color different dinosaur card 40, a bar code columns 49 where bar codes are indicated for the card reader 13 of the game device 10 to read for reading the card are indicated.

(Move Card)

Figure 6:
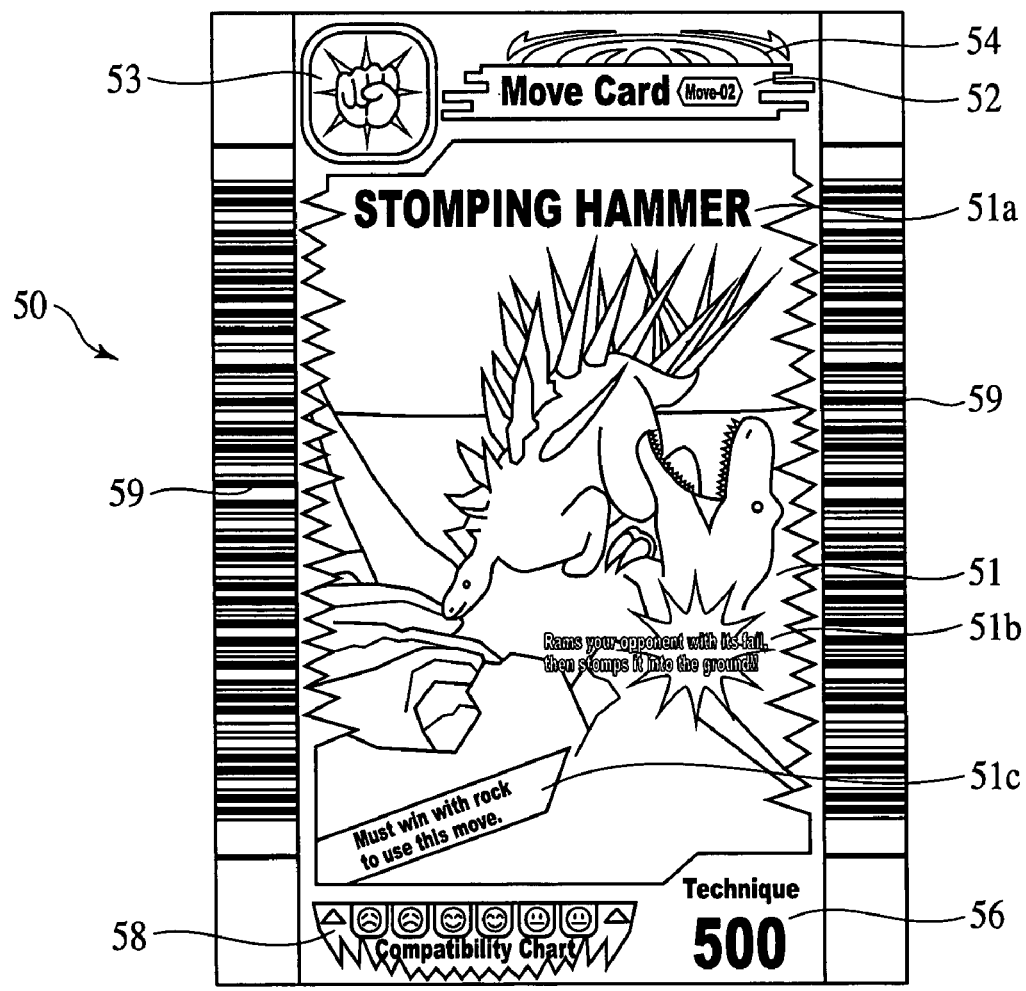
FIG. 6 is a view of the move card which is an example of the game card used in the game system according to the present invention.

The move card 50 will be explained with reference to FIG. 6. FIG. 6 illustrates the front side of the move card 50. On the backside of the move card 50, the explanation, etc. of the card are described, but they are not detailed here.

The dinosaur cards 20, 30, 40 are read by the card reader 13 of the game device 10 to thereby set a dinosaur which is the partner of a game player, and then the move card 50 is read by the card reader 13 of the game device 10 to thereby input various moves in the dinosaur which is the partner of the game player.

As illustrated in FIG. 6, at the center of the front side of the move card 50, a move visual column 51 where an image of a move is described is provided, and at an upper part in the move visual column 51, a move name column 51a where the name of the move is indicated is provided. At a lower right part in the move visual column 51, a move effect column 51b where the effect of the move is described is provided. At a lower left part in the move visual column 51, a move condition column 51c where a condition for exerting the move is provided.

In FIG. 6, the image of STOMPING HAMMER is described in the move visual column 51, and in the move name column 51a, "STOMPING HAMMER" is indicated, in the move effect column 51b, "Rams your opponent with its fall, then stomps it the ground" is described, and in the move condition column 51c, "Must win with rock to use this move" is described.

At the middle of an upper part of the front side of the move card 50, a move card number indication column 52 where the card name (move card) and a card number are indicated is provided. In FIG. 6, "Move Card Move-2" is indicated in the move card number indication column 52.

At an upper left part of the front side of the move card 50, a janken (rock-paper-scissors) mark column 53 where a janken (rock-paper-scissors) hand which permits a move of the move card 50 to be used is indicated is provided. When a move is set by using the move card, and the janken (rock-paper-scissors) hand of the move card wins, a winning move which gives much damage can be used. In FIG. 6, "Rock" is indicated in the janken (rock-paper-scissors) mark column 53.

At the uppermost margin of the front side of the move card 50, a type checker column 54 where a pattern for the confirmation of a usable dinosaur card 20, 30, 40 is indicated is provided. When the pattern indicated in the type checker column 54 and the pattern indicated in the type checker column in the dinosaur card 20, 30, 40 described above agree with each other, the move card can be used.

At a lower right part of the front side of the move card 50, a move indication column 56 where a move is indicated in a value is provided. As the value indicated in the move indication column 56 is larger, the power up value of the move is larger. In FIG. 6, "Technique 500" is indicated in the technique indication column 56.

At the lowermost margin of the front side of the move card 50, a compatibility checker column 58 for the confirmation of the compatibility with the dinosaur cards 20, 30, 40 is provided. When a pattern described in the compatibility checker column 58 and a pattern described in the compatibility checker column of the dinosaur card 20, 30 40 agree with each other, it can be confirmed that the move card 50 is compatible with the dinosaur card.

At the left and right margins of the front side of the move card 50, bar code columns 59 where bar codes for the card reader 13 of the game device 10 to read are indicated are provided.

(Super Move Card)

The super move card will be explained with reference to FIG. 7. FIG. 7 illustrates the front side of the super move card

60. On the back side of the super move card 60, the explanation, etc. of the super move are described, but they are not detailed here.

The dinosaur cards 20, 30, 40 are read by the card reader 13 of the game device 10 to thereby set a dinosaur which is the partner of a game player, and then the super move card 60 is read by the card reader 13 of the game device 10 to thereby store various moves in the dinosaur which is the partner of the game player.

The super move card 60 is one kind of the move card and has one of the attributes "Fire", "Water", "Lightning", "Earth", "Glass", and "Wind". The super move card 60 can be used for the dinosaur card which agrees in the attribute. When the super move card 60 agrees with the dinosaur card in the attribute, the super move card 50 permits the use of a winning move which has a large attack force and much damage the competitor.

As illustrated in FIG. 7, at the center of the front side of the super move card 60, a move visual column 61 where an image of the move is described is provided. At an upper part in the move visual column 61, a move name column 61a where the name of the move is indicated is provided. At an upper left part in the move visual column 61, a move attribute column 61b where the attribute of the move is indicated is provided. At a lower left part in the move visual column 61, a move effect column 61c where the effect of the move is indicated is provided. At a lower left part in the move visual column 61, a move condition column 61d where the condition for exerting the move is described is provided.

In FIG. 7, the image of AQUA WHIP is described in the move visual column 61, "AQUA WHIP" is described in the move name column 61a, the attribute mark "fire" is described in the move attribute column 61b, "Grasp your opponent and smashes him into the ground" is described in the move effect column 61c, and in the move condition column 61d, "Must win with paper to use this move" is described.

At the middle of an upper part of the front side of the super move card 60, a move card number indication column 62 where the card name (super move card) and the card number are indicated is provided. In FIG. 7, "Super Move Card Water-03" is indicated in the move card number indication column 62.

At an upper left part of the front side of the super move card 60, a janken (rock-paper-scissors) mark indication column 63 where a janken (rock-paper-scissors) hand which permits the move of the super move card 60 to be used is provided. When the move is set by using the super move card 60, and the janken (rock-paper-scissors) is won with the janken (rock-paper-scissors) hand indicated in the janken (rock-paper-scissors) mark column 63, the winning move which much damages the competitor can be used. In FIG. 7, "Paper" is indicated in the janken (rock-paper-scissors) mark column 63.

At the uppermost margin of the front side of the super move card 60, a type checker column 64 where a pattern for the confirmation of the usable dinosaur card 20, 30, 40 is provided. When the pattern indicated in the type checker column 64 and the pattern indicated in the type checker column of the dinosaur card 20, 30, 40 agree with each other, the move card can be used.

At the let and right margins of the font side of the super move card 60, bar codes for the card reader 13 of the game device 10 to read are indicated are provided.

(Character Card)

The character card will be explained with reference to FIG. 8. FIG. 8 illustrates the front side of the character card 70. On the backside of the character card 70, the explanation, etc. of the character card 70 are presented, but their explanation are not detailed here.

The character card 70 is read by the card reader 13 of the game device 10 before the dinosaur card 20, 30 49 or the move card 50, 60 is read, whereby abilities, characteristics, etc. of characters in stories where villains operating the dinosaurs, boys fighting with the villains, etc., for example, other than the dinosaurs are staged are changed.

Thus, the game player can be interested not only in the matches of the dinosaur fighting gate, but widely in stories, etc. developed in the dinosaur fighting gate.

As illustrated in FIG. 8, at the center of the front side of the character card 70, a character visual column 71 where a character is described is provided, and at an upper part in the character visual column 71, a character name column 71a where the name of the character is indicated is provided. At a lower right part in the character visual column 71, a character profile column 71b where the profile of the character is indicated is provided.

In FIG. 8, the image of a hero MAX is described in the character visual column 71, "Max" is indicated in the character name column 71a, and "12 years old, Loves dinosaurs and hates being wrong. His father is an archaeologist" is described in the character profile column 71b.

At the middle of an upper part of the front side of the character card 70, a character card number indication column 72 where a card name (character card) and a card number are indicated. In FIG. 8, "Character Card C-01" is indicated in the character card number indication column 72.

At an upper left part of the front side of the character card 70, a character attribute column 73 where the attribute of the character card 70 is indicated is provided. When the character card 70 is used to set a character other than a dinosaur, the agreement between the attribute indicated in the character attribute column 73 a the attribute of the used dinosaur card to the move card can influence a story developed in the dinosaur fighting gate and characters.

In the uppermost margin of the front side of the character card 70, a type checker column 74 where a pattern for confirming whether the dinosaur card 20, 30, 49 is usable is described is provided. When the pattern described in the type checker column 74 and the pattern described in the type checker column of the dinosaur card 20, 30 40 agree with each other, special productions are made in stories, etc.

In the left and the right margins of the front side of the character card 70, bar code columns 79 where a bar code to be read by the card reader 13 of the game device 10 is indicated is provided.

(Various Tables)

For the game device 10 used in the game system according to the present embodiment, a game table for storing original data of each game card a data table for storing data of moves which are not provided by the move cards and a game data table for storing data for executing the dinosaurs fighting games are prepared so as to execute the dinosaur fighting games with the game cards.

The card table includes three card tables (a dinosaur card table 200 (FIG. 9A), a move card table 210 (FIG. 9B) and a character card table 220 (FIG. 9C) respectively associated with the kinds (the dinosaur card, the secret dinosaur card, the color different dinosaur car, the move card, the super move card and the character card) of the game cards (dinosaur king card). The card tables 200, 210, 220 are stored in the system memory of the information processing device 100.

The move data table includes a move data table 230 specialized for secret dinosaurs for storing data of moves to be set for the secret dinosaur card. The move data table 230 is stored in the system memory 102 of the information processing device 100.

The game data table includes a dinosaur data tables 301, 302 (FIGS. 11(a1) and 11(a2)) associated with competing players (1P, 2P), move data tables 311, 312 (FIGS. 11(b1) and 11(b2)), common character card tables 321, 322 (FIG. 11(c1) and 11(c2)) and a common janken (rock-paper-scissors) table 330 (FIG. 11(d)). The game data tables 301, 302, 311, 312, 321, 322, 330 are stored in the system memory 102 of the information processing device 100.

(Card Table)

The card table of the present embodiment will be explained with reference to FIG. 9. FIG. 9A is the dinosaur card table 200 for the dinosaur card, the secret dinosaur card and the color different dinosaur card, FIG. 9B is the move card table 210 for the move card the super move card, and FIG. 9C is the character card table 230 for the character card.

(Dinosaur Card Table)

As illustrated in FIG. 9A, the dinosaur card table 200 has a card number column, a dinosaur name column, an attribute column, a winning move column, a strength column, a technique column and a design data column. The design data column stores data of polygons of the dinosaurs in titles of model data which are 3D CG data.

As for the dinosaur card, for the dinosaur card whose card number is "Dragon-01", for example, "Tyrannosaurus" is stored in the dinosaur name column, and "Fire" is stored in the attribute column, "Open Palm Mark (Scissors)" is stored in the winning move column, "2000" is stored in the strength column, "300" is stored on the technique column, and "Tyrannosaurus" is stored in the design data column.

For another dinosaur card whose card number is "Dragon-02", for example, "Saichania" is stored in the dinosaur name column, "Earth" is stored in the attribute column, "Open Palm (Paper)" is stored in the winning move column, "2000" is stored in the strength column, "300" is stored in the technique column, and "Saichania" is stored in the design data column.

As for the secret dinosaur card, for the secret dinosaur card whose card number is "Secret-01", for example, "Therizinosaurus" is stored in the dinosaur name column, "?(None)" is stored in the attribute column, "Rock" is stored in the winning move column, "1500" is stored in the strength column, "∞(infinite)" is stored in the technique column, and "Therizinosaurus" is stored in the design data column.

For another secret dinosaur card whose card number is "Secret-03", for example, "Deinonychus" is stored in the dinosaur name column, "?(None)" is stored on the attribute column, "Paper" is stored in the winning move column, "?(random)" is stored in the strength column, "∞(infinite)" is stored in the technique column, and "Deinonychus" is stored in the design data column.

As described above, in the dinosaur card table 200, the dinosaur names are described in the secret dinosaur cards, but as illustrated in FIG. 4, no dinosaur name is described in the secret dinosaur card itself. That is, no dinosaur name is described on the front side of the secret dinosaur card, and on, the back side of the secret dinosaur card, the same number of "?" as a letter number of the dinosaur name are described.

As for the color different dinosaur card, for the color different dinosaur card whose card number is "Dragon-38A", for example, "Irritator" is stored in the dinosaur name column, "Water" is stored in the attribute column, "Rock" is stored in the winning move column, "1000" is stored in the strength column, "1000" is stored in the technique column, and "Irritator A" is stored in the design data column.

For another color different dinosaur card whose card number is "Dragon-40A", for example, "Wuerhosaurus" is stored in the dinosaur name column, "Earth" is stored in the attribute column, "Paper" is stored in the winning move column, "1000" is stored in the strength column, "1000" is stored in the technique column, and "Wuerhosaurus A" is stored in the design data column.

As described above, in the dinosaur card table 200, the color different dinosaur card has "A" at the end of the card number, and as illustrated in FIG. 5, in the attribute mark column 47 of the color different dinosaur card 40, the pattern "A" indicating the attribute "Act Team (Alpha Gang)" is added to one of the attribute marks of "Fire", "Water", "Lightning", "Earth", "Glass", and "Wind".

(Move Card Table)

As illustrated in FIG. 9B, the move card table 210 has a card number column, a move name column, an attribute column, a janken (rock-paper-scissors) hand kind column, an attribute column, a technique column and a design data column.

As for the move card, for the move card whose card number is "Move-01", for example, "Tail Smash" is stored in the move column, "None" is stored in the attribute column, "Rock" is stored in the janken (rock-paper-scissors) hand kind column, "None" is stored in the technique strength column, "◉◉○○○○" is stored in the compatibility column, "200" is stored in the technique column, and "Tail Smash" is stored in the design data column.

For another move card whose card number is "Move-07", "Death Grind" is stored in the move name column, "None" is stored in the attribute column, "Scissors" is stored in the janken (rock-paper-scissors) hand kind column, "None" is stored in the move strength column, "∆∆◉◉○○" is stored in the compatibility column, "500" is stored in the technique column, and "Death Grind" is stored in the design data column.

In the super move whose card number is "Fire-02", for example, "Big Fire Bomb" is stored in the move name column, "Fire" is stored in the attribute column, "Scissors" is stored in the janken (rock-paper-scissors) hand kind column, "None" is stored in the move strength column, "Type Checker Red" is stored in the compatibility column, "None" is stored in the technique column, and "Big Fire Bomb" is stored in the design data column.

For another super move card whose card number is "Earth-02", for example, "Big Mole Attack" is stored in the move name column, "Earth" is stored in the attribute column, "Scissors" is stored in the janken (rock-paper-scissors) hand kind column, "None" is stored in the move strength column, "Type Checker Purple" is stored in the attribute column, "None" is stored in the technique column, and "Big Mole Attack" is stored in the design data column.

(Character Card Table)

As illustrated in FIG. 9C, the character card table 220 includes a card number column, a character name column and an attribute column.

As for the character card, the character card whose card number "D-01", for example, "Ryuta" is stored in the character name column and "Fire" is stored in the attribute column.

For another character card whose card number is "D-02", for example, "Ryuta" is stored in the character name column, and "Lightning" is stored in the attribute column.

(Move Data Table)

The move data table of the present embodiment will be explained with reference to FIG. 10. FIG. 10 illustrates a data table specialized for secret dinosaurs 230 which stores data of moves set specially for the secret dinosaur card.

When the secret dinosaur card 30 is used, a secret dinosaur based on the card number of the secret dinosaur card 30 is set, and as for the move, a specialized move is set when any move card is read. A secret dinosaur specialized move data table 230 stores data of the moves specialized for the secret dinosaurs.

As illustrated in FIG. 10, the secret dinosaurs specialized move data table 230 has a secret dinosaur column, a janken (rock-paper-scissors) hand kind column, a move column, an attribute column, a move strength column, a compatibility column, a technique column and a design data column.

For the secret dinosaur card 30 whose card number is "Secret-01" (Therizinosaurus) "Nail Blade" is stored in the move column for the janken (rock-paper-scissors) hand kind "Rock", "? mark" is stored in the attribute column, "None" is stored in the move strength column, "None" is stored in the attribute column, "None" is stored in the technique column, and "Nail Blade" is stored in the design mark column.

In the move name for "Scissors" of the janken (rock-paper-scissors) marks, "Gyroslasher" is stored, and "? mark" is stored in the attribute column, "None" is stored in the move strength column, "None" is stored in the compatibility column, "None" is stored in the technique column, and "Gyroslasher" is stored in the design data column.

Furthermore, in the move name column for "Paper" of the janken (rock-paper-scissors) marks, "Dangerous Claw" is stored, "? mark" is store in the attribute column, "None" is stored in the move strength column, "None" is stored in the compatibility column, "None" is stored in the technique column, and "Dangerous Claw" is stored in the design data column.

For the secret dinosaur card 30 whose card number is "Secret-03 (Dinonics)", "Dina Galaxy" is stored in the move name column, "? mark" is stored in the attribute column, "None" is stored in the move strength column, "None" is stored in the compatibility column, "None" is stored in the technique column, and "Dina Galaxy" is stored in the design data column.

In the move name for "Scissors" of the janken (rock-paper-scissors) marks, "Cross Cutter" is stored, "? mark" is stored in the attribute column, "None" is stored in the move strength column, "None" is stored in the compatibility column, "None" is stored in the technique column, and "Cross Cutter" is store din the design data column.

Furthermore, in the move column for "Paper" of the janken (rock-paper-scissors) marks, "Rolling Attack" is stored, "? mark" is stored in the attribute column, "None" is stored in the move strength column, "None" is stored in the compatibility column, "None" is stored in the technique column, and "Rolling Attack" is stored in the design data column.

(Game Data Table)

The game data table of the present embodiment will be explained with reference FIG. 11. FIGS. 11A1 and 11A2 are dinosaur data tables 301, 302, FIGS. 11B1 and 11B2 are move data tables 311, 312, FIG. 11C is a character data table 320, and FIG. 11D is a janken (rock-paper-scissors) table 330.

(Dinosaur Data Table)

As illustrated in FIGS. 11A1 and A2, the dinosaur data tables 301, 302 are provided for the respective competing players.

As illustrated in FIG. 11A1, the dinosaur data table 31 on the 1P side has a dinosaur name column, an attribute column, a winning move column, a strength column, a technique column and a design data column. In these columns, the dinosaur data of the competing 1P side is stored. In the design data column, motion data of mobilized 3D CD data is stored.

For example, when the game player on the 1P side uses the dinosaur card whose card number is "Dragon-01", in the dinosaur data table 301 of the 1P side, "Tyrannosaurus" is stored in the dinosaur name column, "Fire" is stored in the attribute column, "Paper" is stored in the winning move column, "2000" is stored in the strength column, "300" is stored in the technique column, and "Tyrannosaurus" is stored in the design data column.

As illustrated in FIG. 11A2, the dinosaur data table 302 of the 2P side has a dinosaur name column, an attribute column, a winning move column, a strength column, a technique column and a design data column, and in these column, dinosaur data of the competing 2P side is stored.

For example, when the player on the 2P side uses the dinosaur card whose card number is "Dragon-02", in the dinosaur data table 302 of the 2P side, "Saichania" is stored in the dinosaur name column, "Earth" is stored in the attribute column, "Paper" is stored in the winning move column, "2000" is stored in the strength column, "300" is stored in the technique column, and "Saichania" is stored in the design data column.

(Move Data Table)

As illustrated in FIGS. 11B and 11B2, the move data tables 311, 312 are provided for the respective competing players.

As illustrated in FIG. 11B1, the move data table 311 of the 1P side has a move column, an attribute column, a move strength column, a compatibility column, a technique column and a design data column.

For example, when the game player of the 1P side uses the move card whose card number is "Move-01", in the data table 311 of the 1P side, "Tail Smash" is stored in the move column, "None" is stored in the attribute column, "None" is stored in the move strength column, "◉◉○○○○" is stored in the compatibility column, "200" is stored in the technique column, and "Tail Smash" is stored in the design data column.

As illustrated in FIG. 11B1, the data table 312 of the 2P side has a move column, an attribute column, a move strength column, a compatibility column, a technique column and a design data column.

For example, when the game player on the 2P side uses the card whose card number is "Move-02", in the move data table 312 of the 2P side, "Death Grind" is stored in the move column, "None" is stored in the attribute column, "ΔΔ◉◉○○" is stored in the compatibility column, "None" is stored in the move strength column, and "Death Grind" is stored in the design data column.

(Character Data Table)

As illustrated in FIG. 11C1 and 11C2, the character data tables 321, 322 are provided for the respective competing players.

As illustrated in FIG. 11C1, the character data table 321 of the 1P side has a character name column and an attribute column. For example, when the game player on the 1P side uses the character card whose card number is "D-01", in the character data table 311, "Ryuta" is stored in the character name column, and "Fire" is store in the attribute column.

As illustrated in FIG. 11C2, the character data table 322 of the 2P side has a character name column, and an attribute column. For example, when the game player on the 2P side uses the character card whose card number is "D-02", in the character data table 322 of the 2P side, "Ryuta" is stored in the character name column, and "Lightning" is stored in the attribute column.

(Janken (rock-paper-scissors) Data Table)

As illustrated in FIG. 11D, the janken (rock-paper-scissors) data table 330 is provided commonly for the competing players.

The janken (rock-paper-scissors) data table 330 has a 1P-side janken (rock-paper-scissors) data column and a 2P-side janken (rock-paper-scissors) data column.

For example, when "Rock" is stored in the janken (rock-paper-scissors) data column of the 1P side, and "Scissors" is stored in the janken (rock-paper-scissors) data column of the 2P side, it is judged that the player on the 1P side has won the janken (rock-paper-scissors).

(Summary of the Game)

The game of the game system according to the present embodiment will be summarized. The game of the present embodiment is a dinosaur fighting gate with game cards.

The game contents of the present game are a card fighting game for fighting dinosaurs with each other. As the game cards, the dinosaur card indicating dinosaur and the move cards indicating moves for the fight. The character cards indicating characters are used as required.

When a game player inserts a coin into the game device 10, one sheet of the game card, the dinosaur card or the move card, is discharged. The game players on the 1P side and the 2P side respectively input combinations of the dinosaur cards and the move cards to set the fighting dinosaurs. Then, the game player on the 1P side and the game player on the 2P side input kinds of the janken (rock-paper-scissors) with the three input buttons 14a, 14b, 14c; 15a, 15b, 15c to win the janken (rock-paper-scissors).

The state of the dinosaur of the game player who has won the janken (rock-paper-scissors) attacking the dinosaur of the game player who has lost the janken (rock-paper-scissors) with the set move is displayed on the display monitor 16.

(Examples of Game Proceeding)

Examples of the game proceeding with the game system according to the present embodiment will be explained with reference to FIGS. 12 to 18. FIGS. 12 to 15 are flow charts of the game proceedings with the game system according to the present embodiment, and FIGS. 16 to 18 are views of game images of the game system according to the present embodiment.

Figure 12:
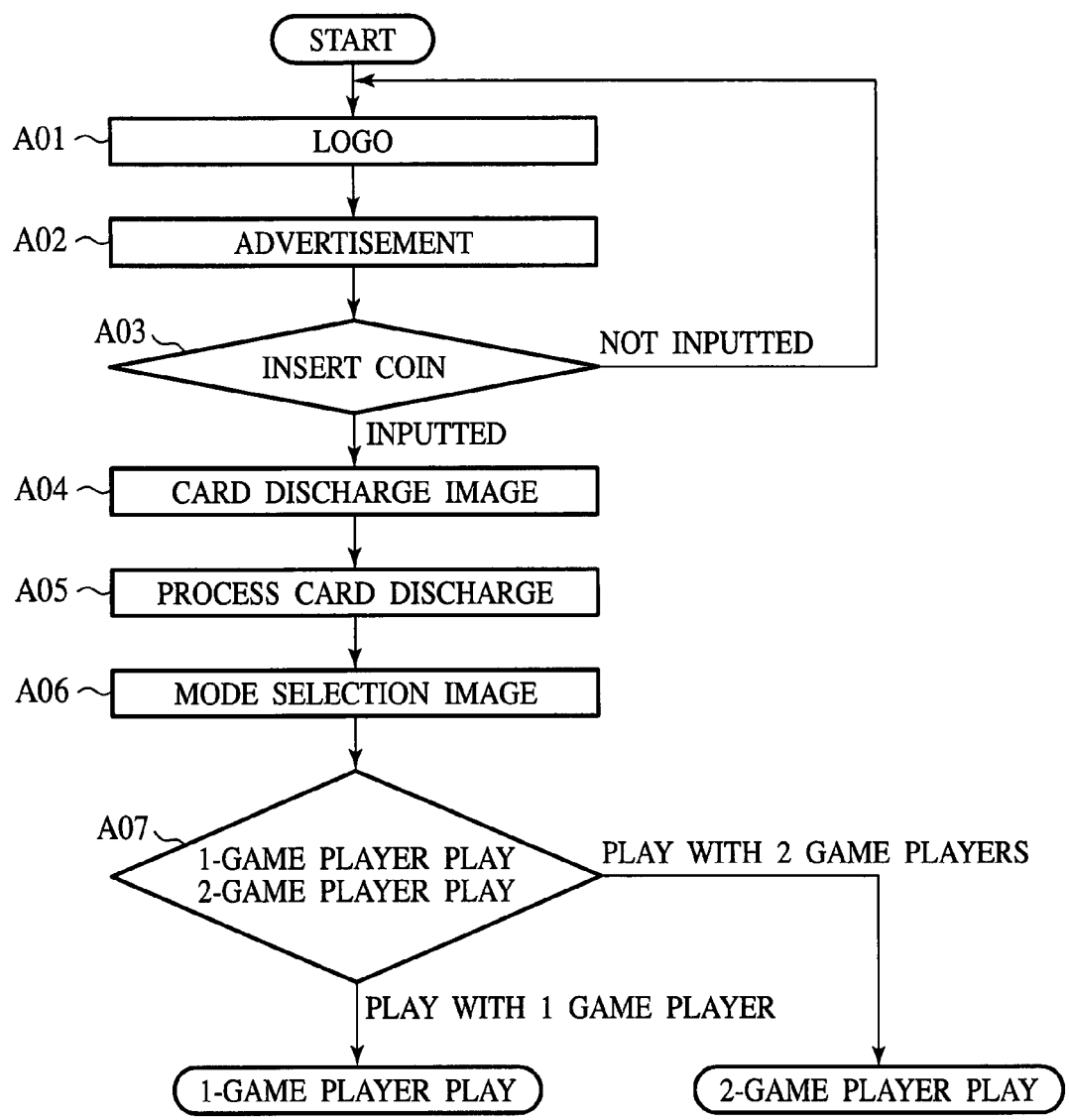
FIG. 12 is the flow chart of the operation sequence of the game processing in the game system according to the embodiment of the present invention (Part 1).

As in the flow chart of FIG. 12, the game device 10 displays a logo of the game vender on the display monitor 16 (Step A01), then, displays an advertisement image (Step A01), and then waits for a game player to insert coins (Step A03).

When the game player inserts a coin which is the game money into the coin selector 19, and the coin selector 18 receives the inserted coins, the game device 10 displays a card discharge image on the display monitor 16 (Step A04) and executes the card discharge processing (Step A05). The game cards are discharged into the card outlet 17 from the card vender (not illustrated).

Next, the game device 10 displays a mode selection image on the display monitor 16 (Step A06)

Figure 16A:
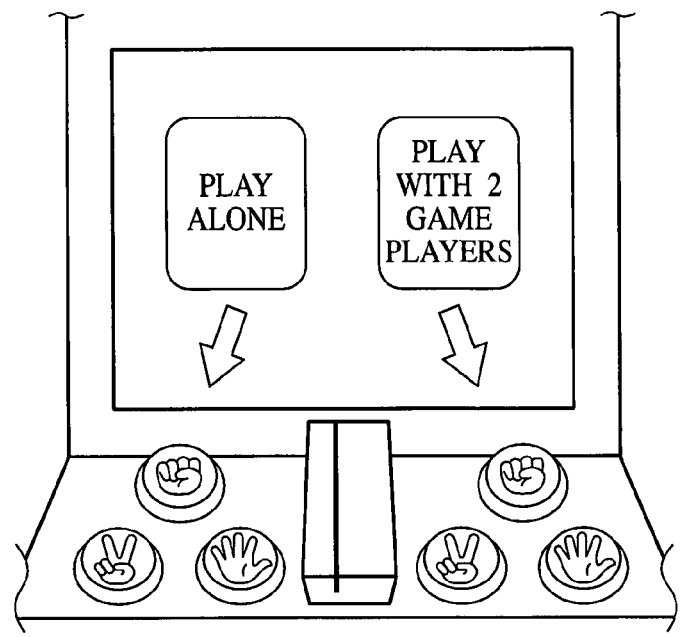
FIG. 16 is views of game images of the game system according to the embodiment of the present invention (Part 1).

An example of the mode selection image is illustrated in FIG. 16A. In the present embodiment, the mode of one game player playing the fighting game with the computer and the mode of two game players playing the fighting gate with each other are provided. As illustrated in FIG. 16A, the letters "play alone" and an arrow indicating the input buttons 14a, 14b, 14c on the left side are displayed at a left part of the mode selection image, and at a right part of the mode selection image, the letters "play with two game players" and an arrow indicating the input buttons 15a, 15b, 15c on the right side are displayed.

The game device 10 waits for the game player to select the mode (Step A07).

When the game player pushes one of the input buttons 14a, 14b, 14c on the 1P side, the mode of one game player playing the game is selected, and the game processing for the 1-game player play mode (FIG. 13) follows. When the game player pushes one of the input buttons 15a, 15b, 15c on the 2P side, the mode of 2 game players playing the game is selected, and the game processing for the 2-game player play mode (FIG. 14) follows.

It is possible that in selecting the 1-game player play mode, the strength of the computer is changed by pushing a different number of the input buttons on the 1P side.

For example, when one of the input buttons 14a, 14b, 14c is pushed, the computer competes with the usual strength; when 2 of the input buttons 14a, 14b, 14c are simultaneously pushed, the computer becomes stronger than usual; and when the three input buttons 14a, 14b, 14c are concurrently pushed, the computer becomes strongest.

(One-Game Player Play)

The processing of the 1-game player play of the present embodiment will be explained with reference to the flow chart of FIGS. 13 to 15.

First, the game device 10 displays an invent scene for the 1-game player play on the display monitor 16 (Step B01).

Figure 16B:
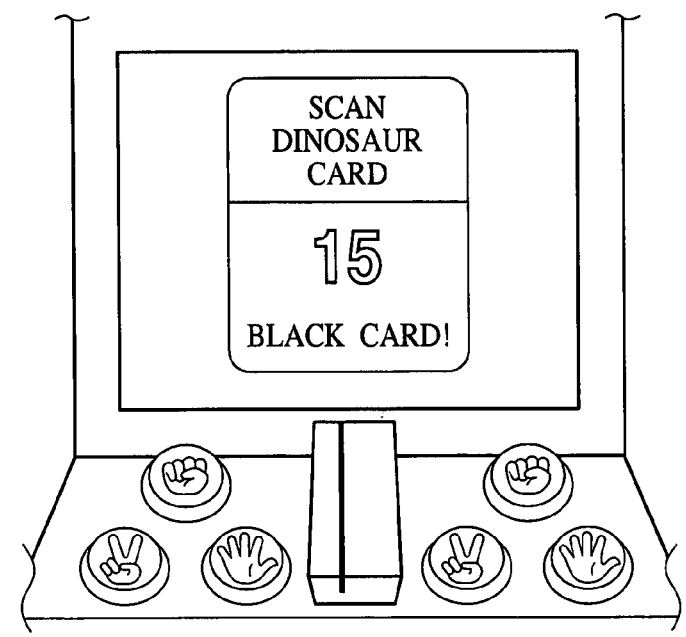

Next, the game device 10 displays an image calling for the scan of the dinosaur card (Step B02). FIG. 16B illustrates an example of the image calling for the scan of the dinosaur card.

In the present embodiment, it is possible that as described above, the character card 70 is read by the card reader 13 of the game device 10 before the dinosaur card 20, 30, 40 and the move cards 50, 60 are read, whereby the ability, characteristics, etc. of characters other than the dinosaurs staged in the dinosaurs fighting game, e.g., characters in stories where villains operating the dinosaurs, boys who fight with the villains, etc. are staged.

Then, the game device 10 waits for the input of the character card 70 as a game card before the input of the dinosaur card (Step B03). When the game player causes the card reader 13 to read the character card 70, a character story is set in Step B04, based on the character card 70 read by the card reader 13 (Step B04).

When a prescribed period of time has passed without the game player causing the card reader 13 to read the character card 70 as well, the character story is set in Step B04 (Step B04)

The processing for setting the character?story will be explained with reference to the flow chart of FIG. 15.

First, it is judged which character card has been scanned (Step D01).

When the game player has not caused the card reader 13 to read the character card 70, it is judged that no change has been made to the character of the game player, and the initially set character is set (Step D02). That is, special data, e.g., 0000 and FFFF are stored in the name column and the attribute column of the character data table 321 of the 1P side.

Subsequently, the initially set story is set as the story (Step D03).

When the game player has not caused the card reader 13 to read the character card 70, no character other than the dinosaur may be staged. In this case, no story in which villains operating the dinosaurs, boys who fight with the villains, etc., who are characters other than the dinosaurs is set either.

When the character card 70 the game player has caused the card reader to read is the character on the side of the hero, the character on the side of the hero is set (Step D04) That is, based on a card number of the character card 70 read by the card reader 13, the character name and attribute associated with the card number are read from the character card table 220 and are stored in the name column and the attribute column of the character data table 321 of the 1P side.

Subsequently, as the story, a story of the Hero (D-Kids) side is set (Step D05).

When the character card 70 the game player has caused to be read by the card reader 13 is a character of the Act Team (Alpha Gang) side, the character of the Act Team (Alpha Gang) side is set (Step D06). That is, based on a card number of the character card 70 read by the card reader 13, the character name and attribute of the card number are read from the character card table 220 and are stored in the name column and attribute column of the character data table 321 of the 1P side.

Subsequently, as the story, a story of the Act Team (Alpha Gang) side is set (Step D07).

Figure 13:
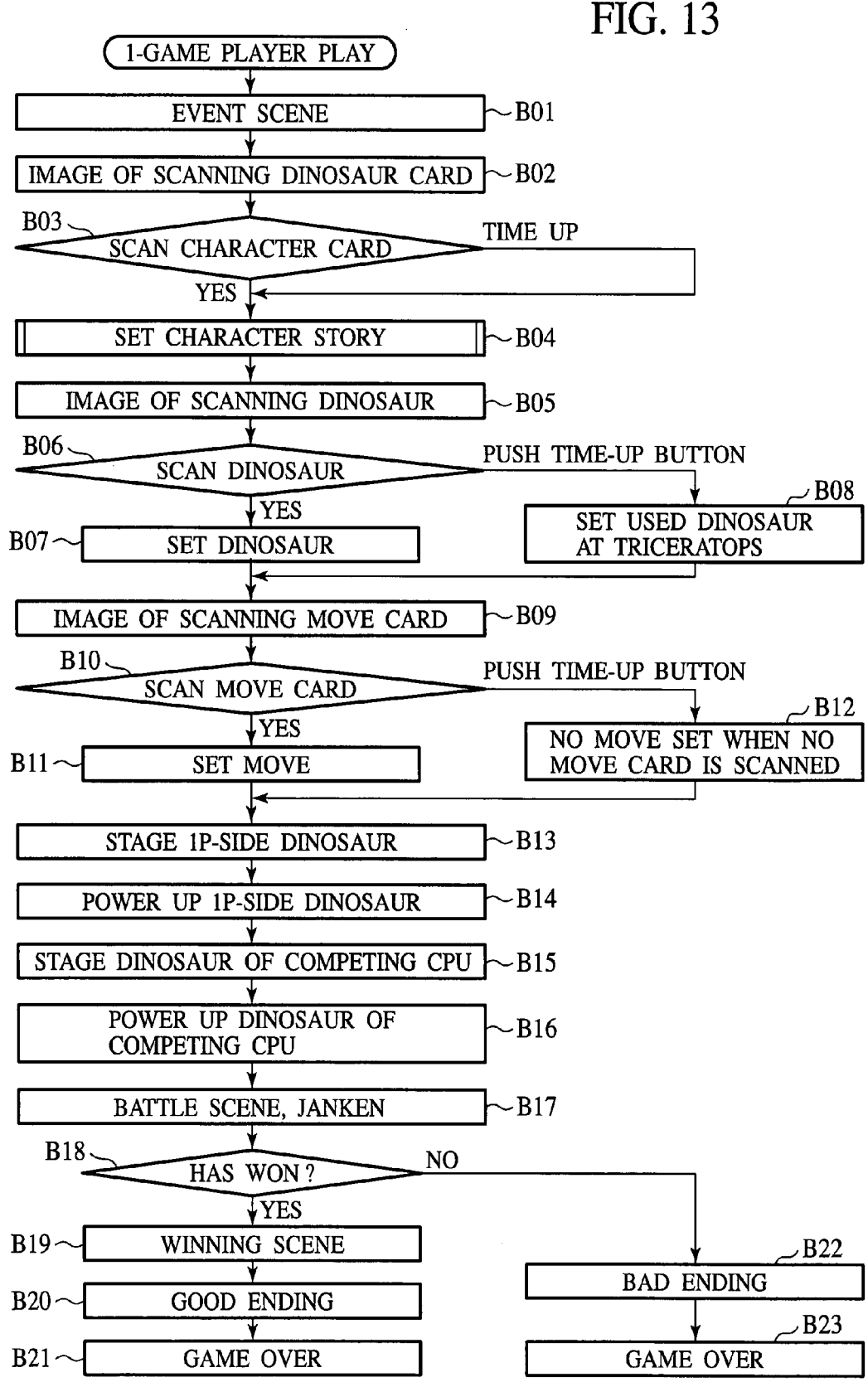
FIG. 13 is the flow chart of the operation sequence of the game processing in the game system according to the embodiment of the present invention (Part 2).

Next, the flow chart of FIG. 13 follows. Subsequently, the game device 10 displays an image which calls for the scan of the dinosaur card on the display monitor 16 (Step B05).

FIG. 16B illustrates an example of the image which calls for the scan of the dinosaur card. At an upper part in the image, the letters of "Scan the dinosaur card" are displayed, a remaining time "15" is displayed at the center, and the letters of "Black card" are displayed at a lower part.

Then, the game device 10 waits for the dinosaur cards 20, 3 40 as the game cards to be inputted.

When the game player has caused the card reader 13 to read the dinosaur cards 20, 30, 40, a dinosaur is set based on the dinosaur cards 20, 30, 40 read by the card reader 13 (Step B07). That is, based on card numbers of the dinosaur cards 20, 30, 40 read by the card reader 13, the dinosaur names, the attributes, the winning moves, the strength, the techniques and design data are read from the dinosaur card table 220 and are stored in the dinosaur name column, the attribute column, the winning move column, the strength column, the technique column and the design data column.

When the game player pushes the input button 14a-15c, or a prescribed period of time has passed, it is judged that no dinosaur card has been inputted, and a pre-set dinosaur, e.g., Triceratops is set (Step B08). That is, the respective data of the preset dinosaur are stored in the dinosaur name column, the attribute name column, the winning move column, the strength column, the technique column and the design data column.

Next, the game device 10 displays an image which calls for the scan of the move card on the display monitor 16 (Step B09).

Figure 17A:
FIG. 17 is views of game images of the game system according to the embodiment of the present invention (Part 2).
Figure 18:
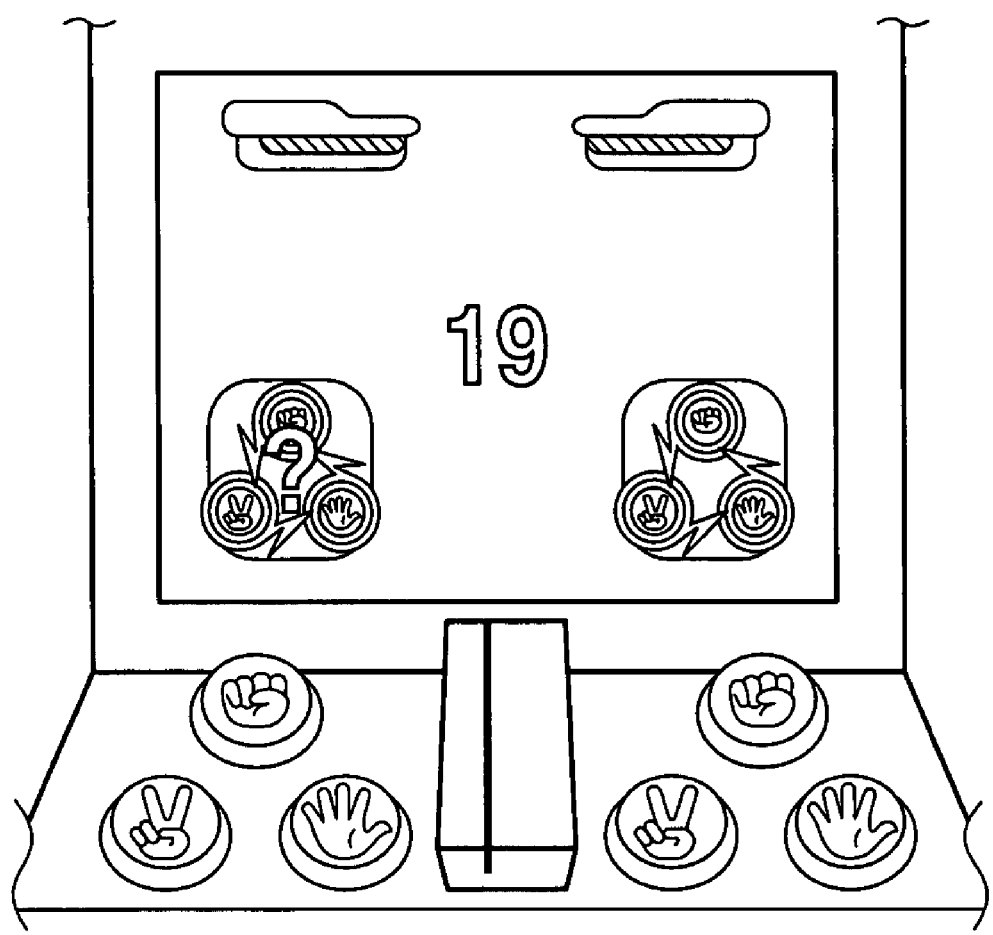
FIG. 18 is a view of a game image of the game system according to the embodiment of the present invention (Part 3).

FIG. 17A illustrates an example of the image which calls for the scan of the move card. At an upper part in the image, the letters "Next, store the move" are displayed, a combination of 3 kinds of janken (rock-paper-scissors) marks, and a remaining time "20" is displayed, overlapping the combination of 3 kinds of janken (rock-paper-scissors) marks.

Then, the game device 10 waits for the move card 50, 60 as the game card to be inputted (Step B10).

When the game player has caused the card reader 13 to read the move card 50, 60, based on the move card 50, 60 read by the card reader 13, the move is set (Step B11). That is, based on the card number of the move card 50, 60 read by the card reader 13, the move name, the attribute, the move strength, the compatibility, the technique and the design data are read from the move card table 210 and are stored in the move name column, the attribute column, the move strength column, the compatibility column, the technique column and the design data column of the move data table 311 of the 1P side.

When the game player pushes the input button 14a-15c, or a prescribed period of time has passed, it is judged that no move card has been inputted, and a preset move is set (Step B12). That is, respective data of the preset move are stored in the move name column, the attribute column, the move strength column, the compatibility column, the technique column and the design data column of the data table 302 of the 1P side.

Then, the game device 10 display on the display monitor 16 an image in which the dinosaur of the 1P side generated based on the data stored in the dinosaur data table 30 of the 1P side.

Subsequently, the game device 10 makes the processing for powering up the dinosaur of the 1P side displayed on the display monitor 16 (Step B13).

Next, the game device 10 displays on the display monitor 16 an image in which, as the competing dinosaur of the 2P side, a dinosaur of the CPU generated based on the data stored in the dinosaur data table 302 of the 2P side (Step B15).

In the 2P-side dinosaur data table 302, the 2P-side move data table 312 and the 2P-side character table 322, the respective data of the preset dinosaur of the CPU, move and character are stored at a prescribed timing following the start the game processing for the 1-game player play.

Subsequently, the game device makes the processing for powering up the CPU dinosaur displayed on the display monitor 16 (Step B16).

Next, the game device 10 displays on the display monitor 16 a battle scene in which the dinosaur of the 1P side and the dinosaur of the 2P side fight with each other while making the janken (rock-paper-scissors) between the game player and the CPU (Step B17).

Figure 17B:
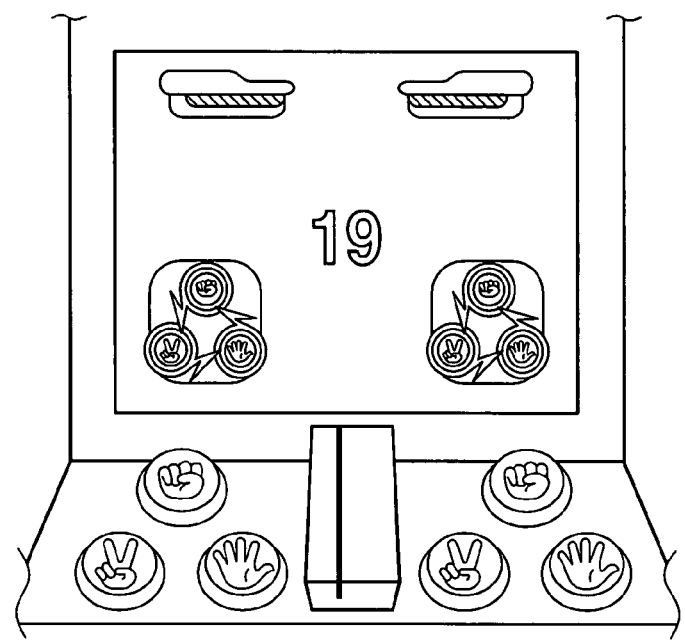

FIG. 17B illustrates an example of the battle scene. at an upper part in the battle scene, bar graphs indicating remaining lives of the 1P side and the 2P side, and at the center of the battle scene, a remaining time "19" is displayed, and combinations of 3 kinds of janken (rock-paper-scissors) marks are displayed at a lower part respectively for the 1P side and the 2P side.

When the game player pushes one of the three input buttons 14a, 14b, 14c and inputs one of "Rock", "Scissors" and "Paper", the kind of the inputted janken (rock-paper-scissors) mark is stored in the data table 330 of the 1P side and is displayed on the display monitor 16. Simultaneously therewith, the CPU stores one of the preset "Rock", "Scissors" and "Paper" in the janken (rock-paper-scissors) data table 330 of the 2P side and displays the janken (rock-paper-scissors) mark on the display monitor 16 to compete the janken (rock-paper-scissors) (Step B17).

Based on the janken (rock-paper-scissors) data table 330, it is judged whether the game player has won the janken (rock-paper-scissors) (Step B18).

When the game player has won the janken (rock-paper-scissors), the game device 10 displays on the display monitor 19 a scene in which the dinosaur of the 1P side attacks the dinosaur of the 2P side (of the CPU side) with the move stored in the data table 311 of the 1P side and wins (Step B19), and subsequently displays a finish scene indicating the win (Step B20), and the competing game is finished (Step B21).

When the game player has lost the janken (rock-paper-scissors), the game device 10 displays on the display monitor 16 a finish iage in which the 2P-side dinosaur (CPU-side dinosaur) attacks the 1P-side dinosaur with the move stored in the 2P-side move data table 312, and the 1P-side dinosaur loses (Step 22), and the competing game is finished (Step B23).

(Two-Game Player Play)

The game processing of the 2-game player play of the present embodiment will be explained with reference to the flow chart of FIGS. 14 and 15.

First, the game device 10 displays an event scene for the 2-game player ply on the display monitor 16 (Step C01).

Next, the game device 10 displays on the display monitor 16 an image which calls for the scan of the dinosaur card of the 1P side (Step C02). An example of the image which calls for the scan of the dinosaur card is illustrated in FIG. 16B.

As described above, in the present embodiment, it is possible that as described above, the character card 70 is read by the card reader 13 of the game device 10 before the dinosaur card 20, 30, 40 and the move cards 50, 60 are read, whereby the ability, characteristics, etc. of characters other than the dinosaurs staged in the dinosaurs fighting game, e.g., characters in stories where villains operating the dinosaurs, boys who fight with the villains, etc. are staged.

Then, the game device 10 waits for the input of the character card 70 of the 1p side as a game card before the input of the dinosaur card (Step C03). When the game player on the 1P side causes the card reader 13 to read the character card 70, a character story of the 1P side is set in Step C04, based on the character card 70 read by the card reader 13 (Step C04).

When a prescribed period of time has passed without the game player of the 1P side causing the card reader 13 to read the character card 70 as well, the character story is set in Step C04.

The processing of setting the character story will be explained with reference to the flow chart of FIG. 15.

First, it is judged which character card has been scanned (Step D01).

When the game player on the 1P side has not caused the card reader 13 to read the character card 70, it is judged that no change is made to the character of the 1P side, and the initially set character is set (Step D02). That is, special data, e.g., 0000 and FFFF are stored in the name column and the attribute column of the character data-table 321 of the 1P side.

Subsequently, as a story, the initially set story is set (Step D03).

When the game player has not caused the card reader to read the character card 70, it is possible that no character other than the dinosaur is staged. In this case, a story in which characters other than the dinosaurs, who are villains operating the dinosaurs, boys fighting the villains, etc. are staged is not set.

When the character card 70 the game player on the 1P side has caused to be read by the card reader 13 is the character of the Hero (D-Kids) side, the character on the Hero (D-Kids) side is set (Step D04). That is, based on a card number of the character card 70 read by the card reader 13, the character and the attribute associated with the card number are read and stored in the name column and the attribute column of the character data table 321 of the 1P side.

Subsequently, as a story, the story of the Hero (D-Kids) side is set (Step D05).

When the character card the game player on the 1P side has caused the card reader 13 to read is the character on the Act Team (Alpha Gang) side, the character on the Act Team (Alpha Gang) side is set (Step D06). That is, based on a card number of the character card 70 read by the card reader 13, the character name and the attribute associated with the card number are read and stored in the name column and the attribute column of the character data table 321 of the 1P side.

Subsequently, as a story, the story of the Act Team (Alpha Gang) side is set (Step D07).

Figure 14:
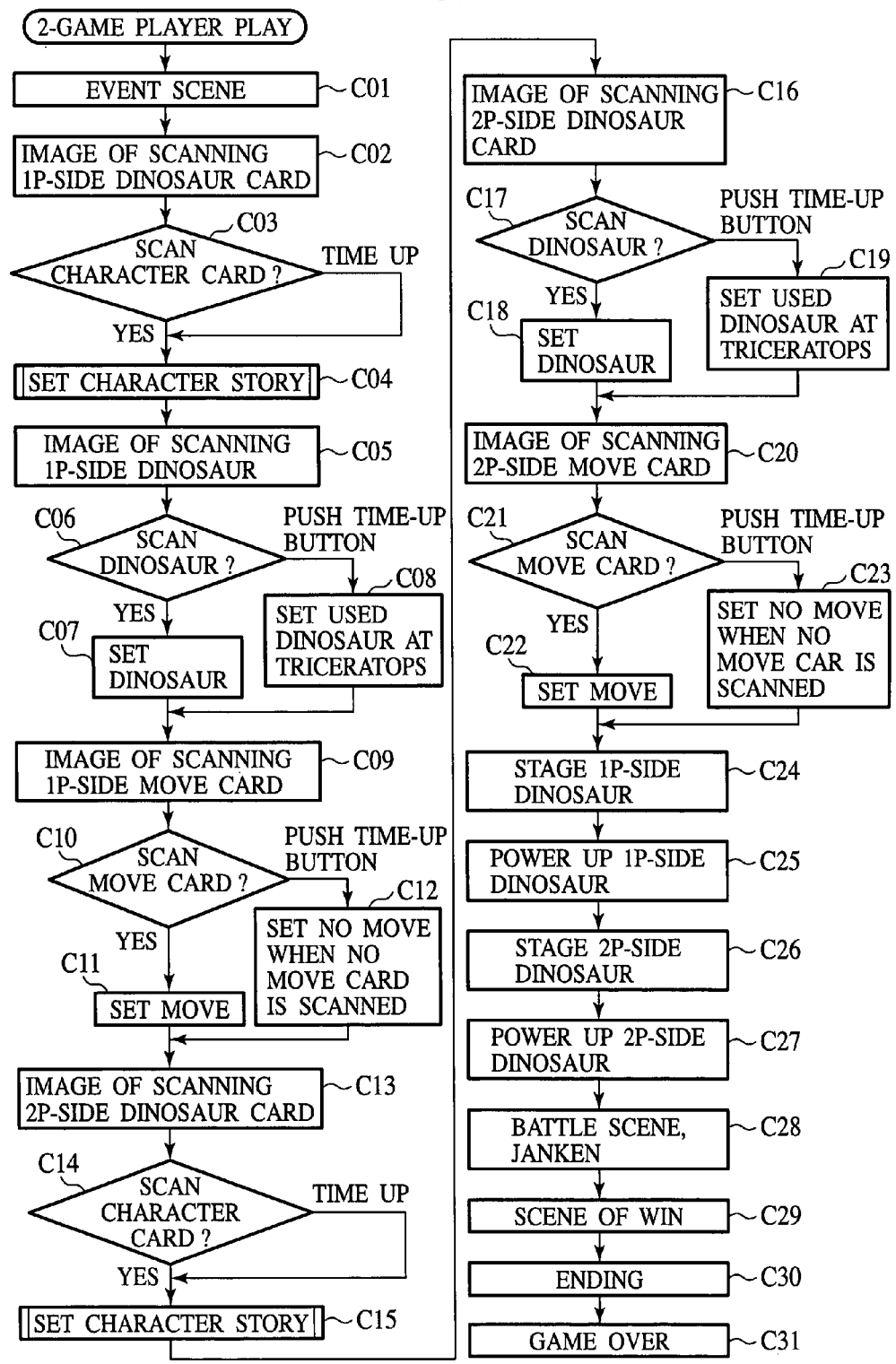
FIG. 14 is the flow chart of the operation sequence of the game processing in the game system according to the embodiment of the present invention (Part 3).
Figure 15:
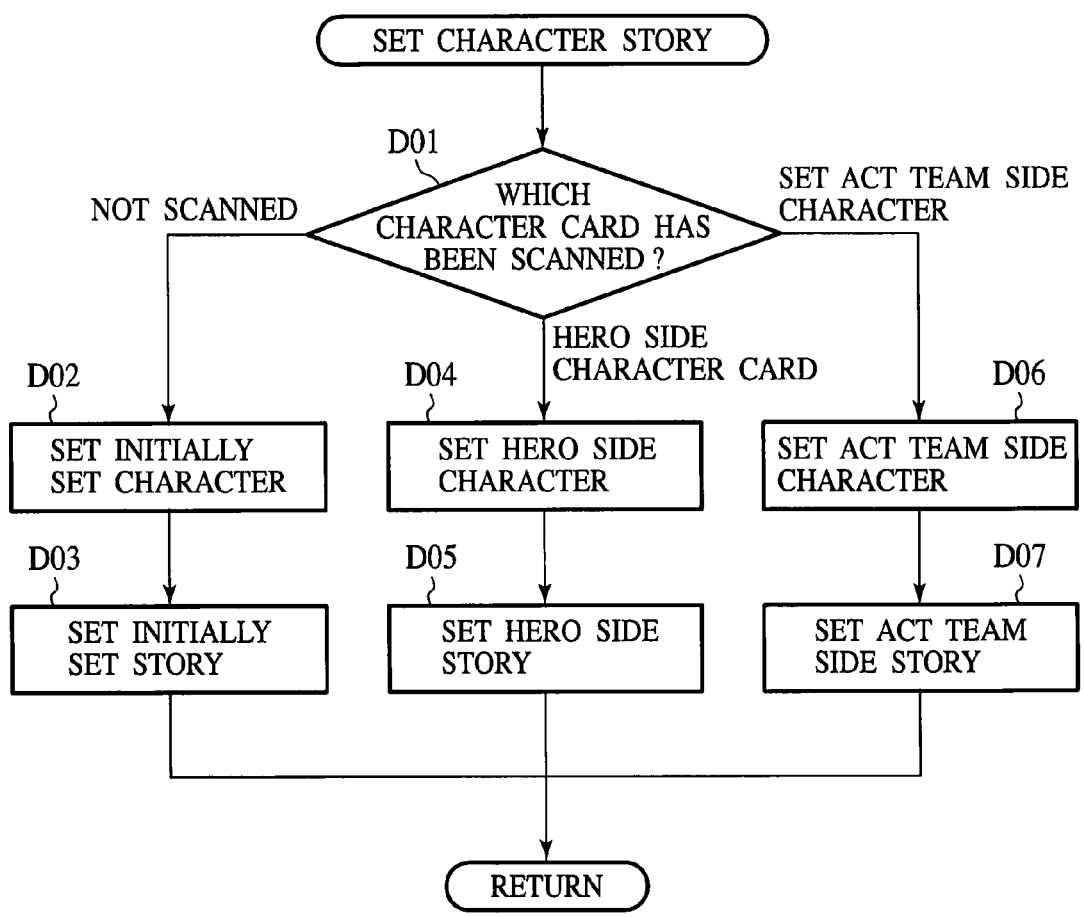
FIG. 15 is the flow chart of the operation sequence of the game processing in the game system according to the embodiment of the present invention (Part 4).

Next, the flow chart of FIG. 14 follows. The game device 10 displays an image which calls for the scan of the dinosaur card of the 1P side on the display monitor 16 (Step C05).

Then, the game device 10 waits for the dinosaur cards 20, 30, 40 of the 1P side as the game cards to be inputted (Step C06).

When the game player causes the card reader 13 to read the dinosaur cards 20, 30, 40, based on the dinosaur cards 20, 30, 40 read by the card reader 13, the dinosaur of the 1P side is set (Step C07). That is, based on card numbers of the dinosaur cards 20, 30, 40 read by the card reader 13, the dinosaur name, attribute, move, strength, technique and design data associated with the card number are read and stored in the dinosaur name column, the attribute column, the move column, the strength column, the technique column and the design data column of the dinosaur data table 301 of the 1P side.

When the game player pushes the input button 14a-14c, or a prescribed period of time has passed, it is judged that no dinosaur card of the 1P side has been inputted, and a preset dinosaur, e.g., Triceratops is set (Step C8). That is, respective data of the preset dinosaur are stored in the dinosaur name column, the attribute column, the winning move column, the strength column, the compatibility column, the technique column and the design data column of the data table 301 of the 1P side.

Then, the game device 10 displays an image which calls for the scan of the move card of the 1P side on the display monitor 16 (Step C09). An example of the image which calls for the scan of the move card is illustrated in FIG. 17a.

Then, the game device 10 waits for the input of the move cards 50, 60 of the 1P side as the game cards (Step C10).

When the game player causes the card reader 13 to read the move cards 50, 60, based on the move cards 50, 60 read by the card reader 12, the move of the 1P side is set (Step C11). That is, based on card numbers of the move cards 50, 60 read by the card reader 13, the move name, the attribute, the move strength, the compatibility, the technique and the design data associated with the card numbers are read from the move card table 210 and stored in the move name column, the attribute column, the move strength column, the compatibility column, the technique column and the design data column.

When the game player pushes the input button 14a-14c, or a prescribed period of time has passed, it is judged that no move card of the 1P side has been inputted, and no move is set for the 1P side (Step C12) That is, the respective data of the preset move are stored in the move column, the attribute column, the move strength column, the compatibility column, the technique column, the design data column.

Next, the game device 10 displays an image which calls for the scan of the dinosaur card of the 2P side on the display monitor 16 (Step C13). An example of the image which calls for the scan of the dinosaur card is illustrated in FIG. 16B.

As described above, in the present embodiment, it is possible that as described above, the character card 70 is read by the card reader 13 of the game device 10 before the dinosaur card 20, 30, 40 and the move cards 50, 60 are read, whereby the ability, characteristics, etc. of characters other than the dinosaurs staged in the dinosaurs fighting game, e.g., characters in stories where villains operating the dinosaurs, boys who fight with the villains, etc. are staged.

Then, the game device 10 waits for the input of the character card 70 of the 2P side as a game card before the input of the dinosaur card (Step C14). When the game player on the 2P side causes the card reader 13 to read the character card 70, a character story of the 2P side is set in Step C04, based on the character card 70 read by the card reader 13 (Step C15).

When a prescribed period of time has passed without the game player of the 2P side causing the card reader 13 to read the character card 70 as well, the character story is set in Step C15 (Step C15).

The processing of setting the character?story will be explained with reference to the flow chart of FIG. 15.

First, it is judged which character card has been scanned (Step D01).

When the game player on the 2P side has not caused the card reader 13 to read the character card 70, it is judged that no change has been made to the character of the 2P side, and the initially set character is set (Step D02). That is, special data, e.g., 0000 and FFFF are stored in the name column and the attribute column of the character data table 321 of the 2P side.

Subsequently, the initially set story is set as the story (Step D03).

When the game player has not caused the card reader 13 to read the character card 70, no character other than the dinosaurs may be staged. In this case, no story in which villains operating the dinosaurs, boys who fight with the villains, etc., who are characters other than the dinosaurs is set either.

When the character card 70 the game player has caused the card reader 13 to read is the character on the side of the hero, the character on the side of the hero is set (Step D04). That is, based on a card number of the character card 70 read by the card reader 13, the character name and attribute associated with the card number are read from the character card table 220 and are stored in the name column and the attribute column of the character data table 321 of the 2P side.

Subsequently, as the story, a story of the Hero (D-Kids) side is set (Step D05).

When the character card 70 the game player on the 2P side has caused to be read by the card reader 13 is a character of the Act Team (Alpha Gang) side, the character of the Act Team (Alpha Gang) side is set (Step D06). That is, based on a card number of the character card 70 read by the card reader 13, the character name and attribute of the card number are read from the character card table 220 and are stored in the name column and attribute column of the character data table 321 of the 2P side.

Subsequently, as a story, the story of the Act side is set (Step D07).

Next, the flow chart of FIG. 14 follows. Subsequently, the game device 10 displays an image which calls for the scan of the dinosaur card of the 2P side on the display monitor 16 (Step C16).

Then, the game device 10 waits for the dinosaur cards 20, 30, 40 of the 2P side as the game cards to be inputted (Step C17).

When the game player causes the card reader 13 to read the dinosaur card 20, 30, 40, based on the dinosaur card 20, 30, 40 read by the card reader 13, the dinosaur of the 2P side is set (Step C18). That is, based on a card number of the dinosaur card 20, 30, 40 read by the card reader 13, the dinosaur name, the attribute, the wining move, the strength, the technique and the design data associated with the card number are read from the dinosaur card table 22 and stored in the dinosaur name column, the attribute column, the winning move column, the strength column, the technique column and the design data column of the dinosaur data table 302 of the 2P side.

When the game player pushes the input button 15a-15c, or a prescribed period of time has passed, it is judged that no dinosaur card of the 2P side has inputted, and as the dinosaur of the 2P side, a preset dinosaur, e.g., Triceratops is set (Step C19). That is, the respective data of the preset dinosaur are stored in the dinosaur name column, the attribute column, the winning move column, the strength column, the technique column and the design data column of the dinosaur data table 302 of the 2P side.

Then, the game device 10 displays an image which calls for the scan of the move card of the 2P side on the display monitor 16 (Step C20). An example of the image which calls for the scan of the move card is illustrated in FIG. 17A.

Then, the game device 10 waits for the input of the move card 50, 60 as the game card (Step C21).

When the game player causes the card reader 13 to read the move card 50, 60, based on the move card 50, 60 read by the card reader 13, the move of the 2P side is set (Step C22). That is, based on a card number of the move card 50, 60 read by the card reader 13, the move name, the attribute, the move strength, the compatibility, the technique and the design data associated with the card number are read from the move card table 210 and stored in the move name column, the attribute column, the move strength column, the compatibility column, the technique column and the design data column of the move data table 312 of the 2P side.

When the game player pushes the input button 15a-15c, or a prescribed period of time has passed, it is judged that no move card has been inputted, and the respective data of the preset move card are stored in the move name column, the attribute column, the move strength column, the compatibility column, the technique column, the design data column of the data table 312 of the 2P side.

Next, the game device 10 displays on the display monitor 16 an image in which the dinosaur of the 1P side generated based on the data stored in the data table 301 of the 1P side is staged (Step C24).

Subsequently, the game device 10 makes the processing for powering up the dinosaur of the 1P side displayed on the display monitor 16 (Step C25).

Subsequently, the game device 10 displays on the display monitor 16 an image in which the dinosaur of the 2P side generated based on the data stored in the dinosaur data table 302 (Step C36).

Subsequently, the game device 10 makes the processing for powering up the dinosaur of the 2P side displayed on the display monitor 16 (Step C27).

Next, the game device 10 displays on the display monitor 16 a battle scene in which the dinosaur of the 1P side and the dinosaur of the 2P side fight with each other while the game player on the 1P side and the game player on the 2P side competing the janken (rock-paper-scissors) (Step C28).

FIG. 17B illustrates an example of the janken (rock-paper-scissors) scene. At the center of the janken (rock-paper-scissors) scene, a remaining time "19" for the janken (rock-paper-scissors) is displayed. At a lower part, combinations of the three janken (rock-paper-scissors) marks are displayed respectively for the 1P side and the 2P side. At a part upper of the janken (rock-paper-scissors) marks, fives of the 1P side and the 2P side are indicated in bar graphs.

The janken (rock-paper-scissors) competition is made by the game player on the 1P side pushes one of the three input buttons 14a, 14b, 14c to input one of "Rock", "Scissors" and "Paper" while the game player on the 2P side pushing one of the three input buttons 15a, 15b, 15c to input one of "Rock", "Scissors" and "Paper" and results of the inputs being displayed on the display monitor 16 (Step C28). Based on the janken (rock-paper-scissors) data table 330, it is judged which game player has won the janken (rock-paper-scissors).

When the game player on the 1P side has wont he janken (rock-paper-scissors), the game device 10 displays on the display monitor 16 a scene in which the dinosaur of the 1P side attacked the dinosaur of the 2P side with the move stored in the data table 311 of the 1P side and wins (Step C29). Subsequently, finish image indicating the win is displayed (Step C30), and the competing game is finished (Step C31).

When the game player on the 2P side has won the janken (rock-paper-scissors), the game device 10 displays on the display monitor 16 a scene in which the dinosaur of the 2P side attacks the dinosaur of the 1P side with the move stored in the data table 312 of the 2P side and wins (Step C29). Subsequently, a finish image indicating the win is displayed (Step C30), and the competing game is finished (Step C31).

(Game Control with Secret Dinosaur Card)

The game control with the secret dinosaur card 30 as the dinosaur card will be explained. The game control will be explained by means of the case that in the 2-game player game, the game player on the 1P side uses the secret dinosaur card 30.

In Step C07, when the game player on the 1P side causes the card reader 13 to read the secret dinosaur car 30, based on the secret dinosaur card 30 read by the card reader 13, the dinosaur of the 1P side is set. That is, based on a card number of the secret dinosaur card 30 read by the card reader 13, the dinosaur name the attribute, the winning move, the strength, the technique and the design data associated with the card number from the dinosaur card table 200 and stored in the dinosaur name column, the attribute column, the winning move column, the strength column, the technique column and the design data column of the dinosaur data table 301 of the 1P side.

In Step C11, when the game player on the 1P side causes the card reader 13 to read the move card 50, 60, the move of the 1P side is set based on the janken (rock-paper-scissors) hand kind alone set by the card 50, 60 read by the card reader 13. That is, the move data is read from the move table 230 specialized for the secret dinosaur, not based on the move data associated with a card number of the move card 50, 60 read by the card reader 13 by based on the janken (rock-paper-scissors) hand kind associated with the card number.

For example, when the secret dinosaur is "Secret-01 (Therizinosaurus)", the same specialized move is read from the secret dinosaur move table 230, corresponding to the janken (rock-paper-scissors) hand kind of the move card 50, 60 read by the card reader 13.

That is, when the janken (rock-paper-scissors) hand kind of the move card 50, 60 read by the card reader 13 is "Rock", irrespective of the card, the move name, the same specialized move "Nail Blade", the attribute, the move strength, the compatibility, the technique and the design data are read and stored in the move name column, the attribute column, the move strength column, the compatibility column, the technique column and the design data column of the data table 311 of the 1P side.

That is, when the janken (rock-paper-scissors) hand kind of the move card 50, 60 read by the card reader 13 is "Scissors", irrespective of the card, the move name, the same specialized move "Gyroslasher", the attribute, the move strength, the compatibility, the technique and the design data are read and stored in the move name column, the attribute column, the move strength column, the compatibility column, the technique column and the design data column of the data table 311 of the 1P side.

That is, when the janken (rock-paper-scissors) hand kind of the move card 50, 60 read by the card reader 13 is "Paper", irrespective of the card, the move name, the same specialized move "Dangerous Claw", the attribute, the move strength, the compatibility, the technique and the design data are read and stored in the move name column, the attribute column, the move strength column, the compatibility column, the technique column and the design data column of the data table 311 of the 1P side.

As described above, for the secret dinosaur, a move which is different from the move associated with the move card the game player has caused the card reader 13 to read is generated.

Furthermore, according to the present embodiment, in the move table specialized for the secret dinosaur 230, strong move data which are not prepared as the usual move card are stored, which allows the secret dinosaur to use the strong move of rarity value, and makes the secret dinosaur more amusing.

FIG. 18 illustrates an example of the scene of the battle with the secret dinosaur card. In both the 1-game player play and the 2-game player play, "?" is indicated in the janken (rock-paper-scissors) mark of the side who has used the secret dinosaur card to inform the game player(s) that which move will be used is unknown.

As illustrated in FIG. 18, at an upper part of the battle scene, remaining lives of the 1P side and eh 2P side are indicated in bar graphs, and a remaining time "19" is indicated at the center, and at a lower part, combinations of the 3 kinds of the janken (rock-paper-scissors) marks are indicated respectively for the 1P side and the 2P side. "?" is indicated in the janken (rock-paper-scissors) mark of the side who has used the secret dinosaur card, in the right janken (rock-paper-scissors) mark in FIG. 18.

(Game Control with Character Card)

The game control with the character card 70 will be explained. The game control will be explained by means of the case, for example, that in the 2-game player play, the game layer on the 1P side has used the character card 70.

In Step C29, a scene, for example, in which the dinosaur on the 1P side attacks the dinosaur on the 2P side and win is displayed. At this time, a story in which characters other than the dinosaur on the 1P side and the dinosaur on the 2P, e.g., villains operating the dinosaurs, boys fighting the villains, etc. are staged is also displayed on the display monitor 16.

At this time, unless data are stored in the character data tables 321, 322, a preset standard story is developed.

However, when data are stored in the character data tables 321, 322, based on the stored data, abilities, characteristics, etc. of the characters other than the dinosaurs, e.g., the villains operating the dinosaurs, the boys fighting the villains, etc. are changed.

Thus, the game players not only are interested in competing in the dinosaurs competing game, but also become widely interested in stories, etc. developed in the dinosaurs competing game.

(Game Control with Color Different Dinosaur Card)

The game control with the color different dinosaur card 40 will be explained. The game control will be explained by means of the case, e.g., that in the 2-game player play, the game player on the 1P side uses the color different dinosaur card 40.

In Step C07, when the game player on the 1P side causes the card reader 13 to read the color different dinosaur card 40, based on the color different dinosaur card 40 read by the card reader 13, the dinosaur on the 1P side is set. That is, based on a card number of the color different dinosaur card 40 read by the card reader 13, the dinosaur name, the attribute, the winning move, the strength, the technique and the design data of the color different dinosaur associated with the card number are read from the dinosaur card table 220 and stored in the dinosaur name column, the attribute column, the winning move column, the strength column, the technique column and the design data column associated with the dinosaur data table of the 1P side.

In Step C24, the game device 10 generates an image, based on the data stored in the dinosaur data table 301 of the 1P side. The dinosaur name, the attribute, the winning move, the strength, the technique and the design data associated with a card number of the color different dinosaur card are read from the dinosaur card table 200 and stored in the dinosaur name column, the attribute column, the winning move column, the technique column and the design data column of the dinosaur data table 301 of the 1P side.

Subsequently, in Step C25, the game device 10 make the processing for powering up the dinosaur on the 1P side displayed on the display monitor 16. When the attribute stored in the attribute column of the dinosaur card table 301 of the 1P side and the attribute stored in the attribute column of the character data table 322 of the 2P side agree with each other, the dinosaur on the 1P side is further powered up.

MODIFIED EMBODIMENTS

The present invention is not limited to the above-described embodiment and can cover other various modifications.

For example, in the above-described embodiment, the game cards have bar codes. However, as long as codes can be read, the codes may be added by other means. For example, cards having OCR letters described, magnetic cards, IC card, etc. may be used.

The above-described embodiment has been explained by means the so-called arcade-type game device. However, domestic game devices, personal computer, portable telephones, etc. may be applied to the game system.

In the above-described embodiment, the janken (rock-paper-scissors) competition using "Rock", "Scissors" and "Paper" is competed. However, for example, when weapons are used, "Sword", "Axe" and "Spear" are involved in determining the strength; when a magic is used, "Light", "Darkness" and "Reason" are involved in determining the strength; or when a fight is used, "Knock", "Hold", and "Throw" are involved in determining the strength. In determining the strength in the fight, "Knock" is superior to "Throw", "Hold" is superior to "Knock", and "Throw" is superior to "Hold". Furthermore, in determining the strength, 3 items are not essentially involved, and 4 items, or 5 items may be used in determining the strength.

What is claimed is:

1. A game system including a code reading means for reading a code recorded in a card, a computer program executing means for executing a game in which at least two characters compete, and a display screen for displaying an image generated by the computer program executing means, the game system comprising:
a character generating means which generates a character;
a move setting means which sets a move executed by the character; and
a display means for displaying on the display screen an image in which the character generated by the character generating means executes the move set by the move setting means to fight, whereby
when a first code recorded in a first card with a character indicated thereon is read by the code reading means, the character generating means generates the character corresponding to the first code and indicated on the first card;
when a second code recorded in a second card with a move indicated thereon is read by the code reading means, the move setting means sets the move corresponding to the second code and indicated on the second card; and
when a special code recorded in a special card upon which no character is indicated is read by the code reading means, the character generating means generates a preset character corresponding to the special code and which is different from the character indicated on the first card, and the move setting means sets a preset move which is different from the move indicated on the second card.

2. A game system according to claim 1, wherein said preset move is stronger than the move indicated on the second card.

3. A game system according to claim 1, wherein said preset move is a move which is not prepared as the second cards.

4. A game system including a code reading means for reading a code recorded in a card, a computer program executing means for executing a game in which at least two character fight, and a display screen for displaying an image generated by the computer program executing means, the game system comprising:
a character generating means which generates a character;
a move setting means which sets a move executed by the character; and
a display means for displaying on the display screen an image in which the character generated by the first character generating means executes the move set by the move setting means to fight, whereby
when a first code recorded in a first card with a character indicated thereon is read by the code reading means, the character generating means generates the character corresponding to the first code and indicated on the first card;
when a second code recorded in a second card with a move indicated thereon is read by the code reading means, the move setting means sets the move corresponding to the second code and indicated on the second card;
when a third code recorded in a third card with a second character indicated thereon is read by the code reading means, the character generating means generates the second character corresponding to the third code and indicated on the third card, and the display means displays on the display screen an image containing the first character executing the move to fight and the second character.

5. A game system according to claim 4, wherein the second character does not fight with a character the first character fights with.

6. A storage medium containing a computer program for execution by a computer system, the computer system including a code reading means for reading a code recorded in a card, a computer program executing means for executing a game in which at least two characters compete, and a display screen for displaying an image generated by the computer program executing means, the computer program executing:
a character generating step of generating a character;
a move setting step of setting a move executed by the character; and
a displaying step of displaying on the display screen an image in which the character generated in the character generating step executes the move set in the move setting step to fight, whereby
when a first code recorded in a first card with a character indicated thereon is read by the code reading means, the character corresponding to the first code and indicated on the first card is generated during the character generating step;

when a second code recorded in a second card with a move indicated thereon is read by the code reading means, the move corresponding to the second code and indicated on the second card is set during the move setting step; and when a special code recorded in a special card upon which no character is indicated is read by the code reading means, a preset character corresponding to the special code and which is different from the character indicated on the first card is generated during the character generating step, and a preset move which is different from the move indicated on the second card is set during the move setting step.

7. The storage medium according to claim 6, wherein said preset move is stronger than the move indicated on the second card.

8. The storage medium according to claim 6, wherein said preset move is a move which is not prepared as the second cards.

9. A storage medium containing a computer program for execution by a computer system, the computer system including a code reading means for reading a code recorded in a card, a computer program executing means for executing a game in which at least two characters compete, and a display screen for displaying an image generated by the computer program executing means, the computer program executing:

a character generating step of generating a character;

a move setting step of setting a move executed by the character; and a displaying step of displaying on the display screen an image in which the first character generated in the character generating step executes the move set in the move setting step to fight, whereby when a first code recorded in a first card with a first character indicated thereon is read by the code reading means, the character corresponding to the first code and indicated on the first card is generated during the character generating step;

when a second code recorded in a second card with a move indicated thereon is read by the code reading means, the move corresponding to the second code and indicated on the second card is set during the move setting step; and when a third code recorded in a third card with a second character indicated thereon is read by the code reading means, the second character corresponding to the third code and indicated on the third card is generated during the character generating step, and an image containing the first character executing the move to fight and the second character is displayed during the displaying step.

10. The storage medium according to claim 9, wherein the second character is a character who does not fight with a character the first character fights with.

11. A record medium which can be read by a computer and stores a computer program according to any one of claims 6 to 9 and 10.

* * * * *